US010156878B2

(12) United States Patent
Yokoyama et al.

(10) Patent No.: US 10,156,878 B2
(45) Date of Patent: Dec. 18, 2018

(54) IMAGE PROCESSING APPARATUS, METHOD FOR CONTROLLING IMAGE PROCESSING APPARATUS, AND RECORDING MEDIUM

(71) Applicant: CANON KABUSHIKI KAISHA, Tokyo (JP)

(72) Inventors: Junnosuke Yokoyama, Tokyo (JP); Yusuke Horishita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 323 days.

(21) Appl. No.: 14/621,207

(22) Filed: Feb. 12, 2015

(65) Prior Publication Data

US 2015/0234474 A1 Aug. 20, 2015

(30) Foreign Application Priority Data

Feb. 18, 2014 (JP) .................................. 2014-028212

(51) Int. Cl.
*G06F 1/32* (2006.01)
*G06F 1/26* (2006.01)

(52) U.S. Cl.
CPC ............... *G06F 1/26* (2013.01); *G06F 1/325* (2013.01); *G06F 1/3231* (2013.01); *G06F 1/3287* (2013.01); *Y02D 10/171* (2018.01); *Y02D 10/173* (2018.01)

(58) Field of Classification Search
CPC ................................ G06F 3/017; G06F 1/3296
See application file for complete search history.

(56) References Cited

U.S. PATENT DOCUMENTS

| 7,646,501 B2 | 1/2010 | Ikeda | |
|---|---|---|---|
| 2010/0063636 A1* | 3/2010 | Matsumoto | G05B 15/00 700/276 |
| 2014/0118257 A1* | 5/2014 | Baldwin | G06F 3/017 345/158 |
| 2014/0191972 A1* | 7/2014 | Case | G06F 3/017 345/168 |
| 2015/0245005 A1* | 8/2015 | Grossman | G06F 3/0227 348/51 |

FOREIGN PATENT DOCUMENTS

| CN | 1519682 A | 8/2004 |
|---|---|---|
| CN | 102065195 A | 5/2011 |
| CN | 102854769 A | 1/2013 |
| CN | 202795225 U | 3/2013 |
| CN | 103428388 A | 12/2013 |

(Continued)

*Primary Examiner* — Jaweed A Abbaszadeh
*Assistant Examiner* — Sumil M Desai
(74) *Attorney, Agent, or Firm* — Canon U.S.A., Inc. IP Division

(57) ABSTRACT

An image processing apparatus capable of entering a power saving state includes a detection unit configured to detect an object, a determination unit configured to determine whether there is a human hand in a position higher than a predetermined height based on a detection result of the detection unit, and a control unit configured to, if the determination unit determines that there is a human hand in the position higher than the predetermined height, make the image processing apparatus return from the power saving state.

10 Claims, 19 Drawing Sheets

WHEN H IS HIGH

(56) References Cited

FOREIGN PATENT DOCUMENTS

| | | | |
|---|---|---|---|
| JP | H03-096969 A | 4/1991 | |
| JP | 2006-013584 A | 1/2006 | |
| JP | 2013020048 A * | 7/2011 | ............ G03G 21/14 |
| JP | 2013-007847 A | 1/2013 | |
| JP | 2013-020048 A | 1/2013 | |
| JP | 2013-190701 A | 9/2013 | |
| JP | 2013-201700 A | 10/2013 | |

* cited by examiner

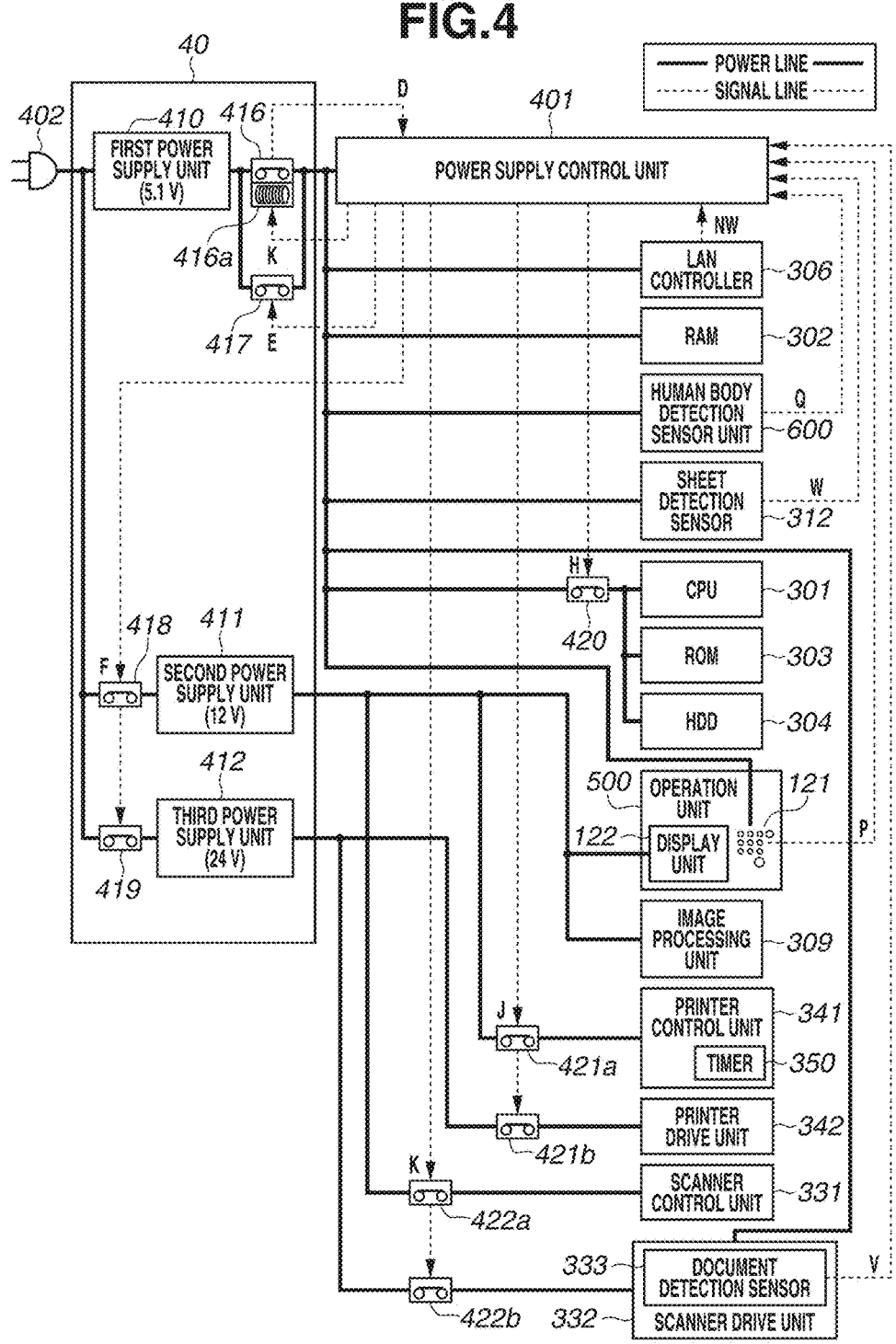

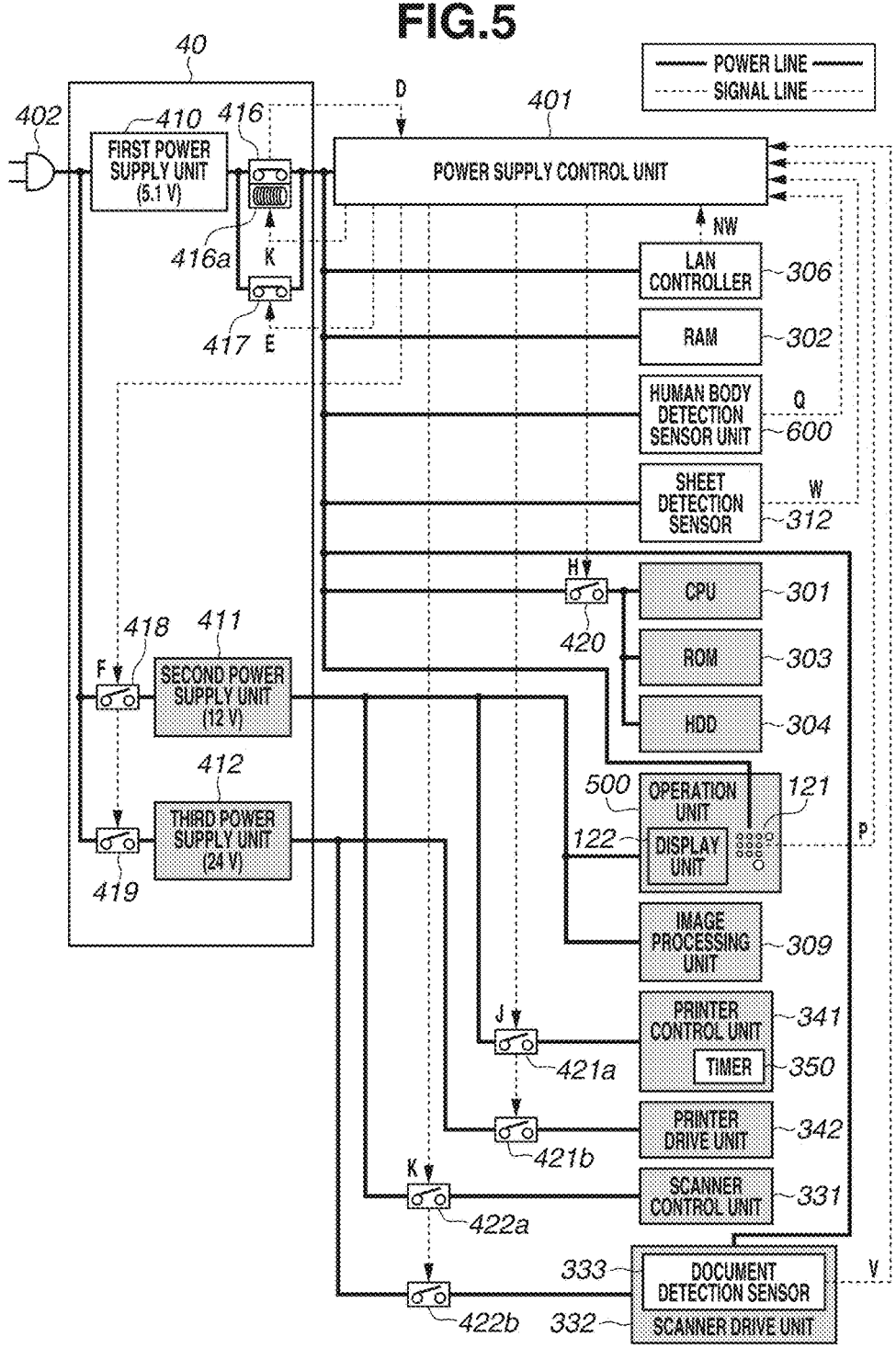

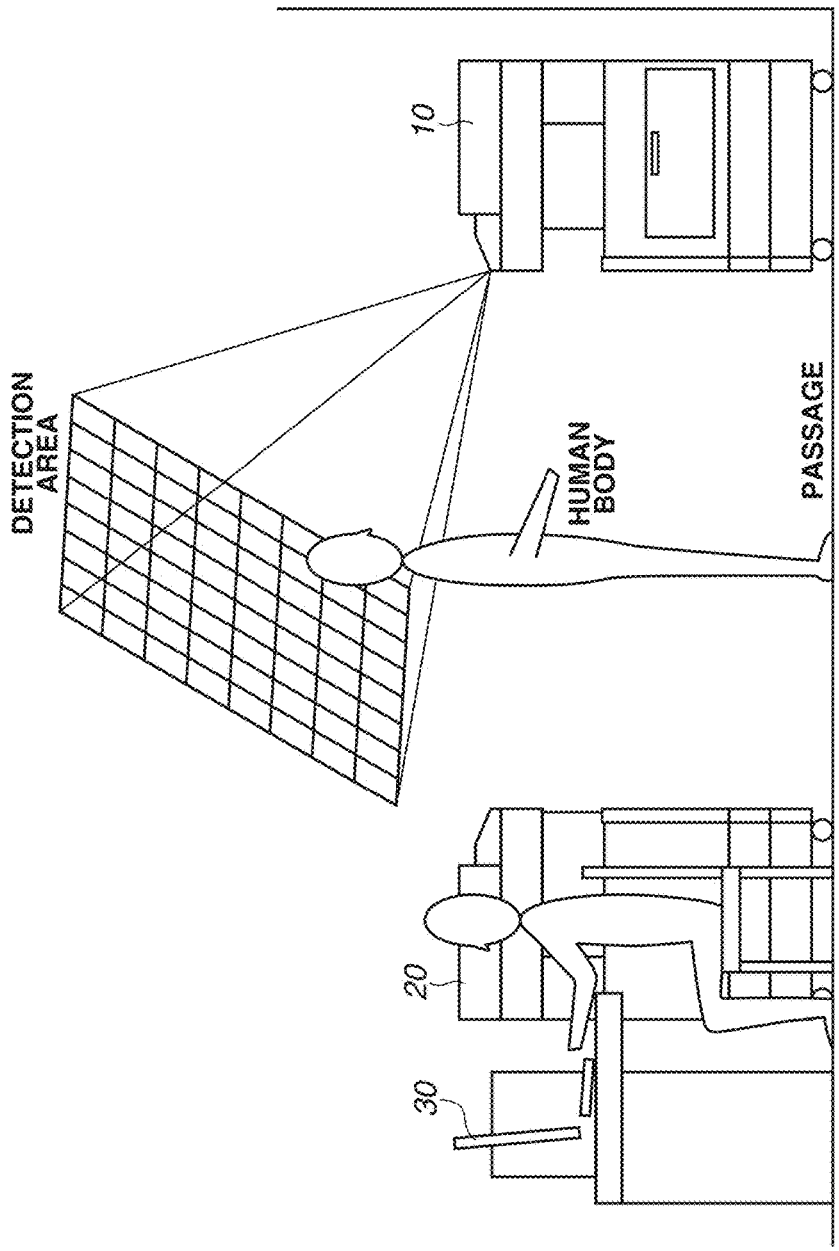

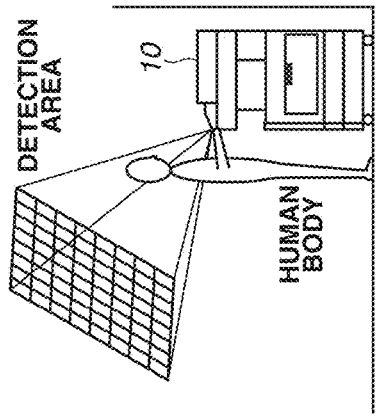
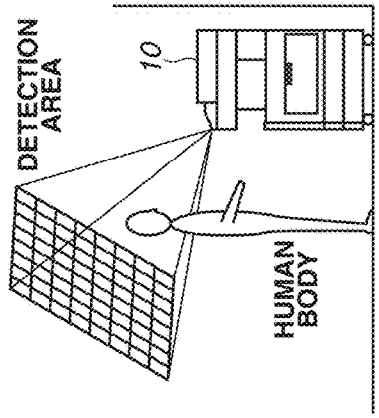
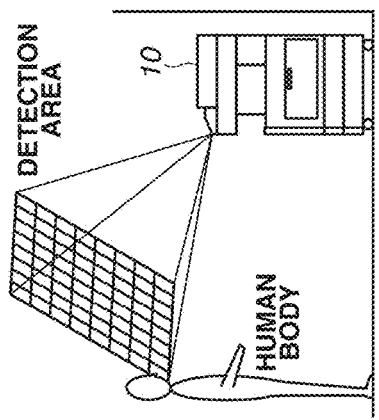
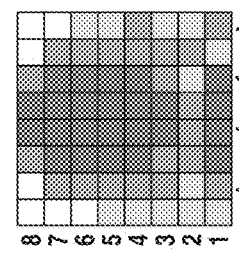
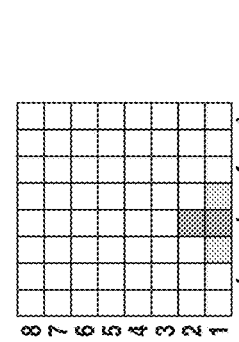

FIG.8A
WHEN CEILING LIGHT IS OFF
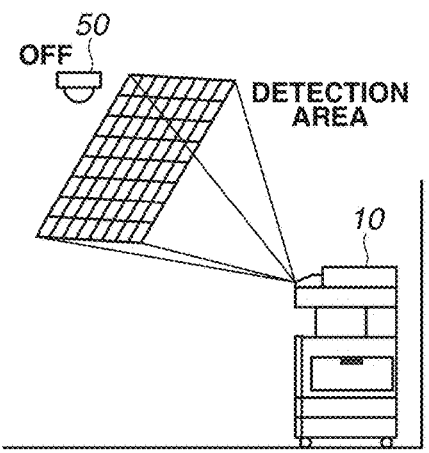
FIG.8B
WHEN CEILING LIGHT IS ON
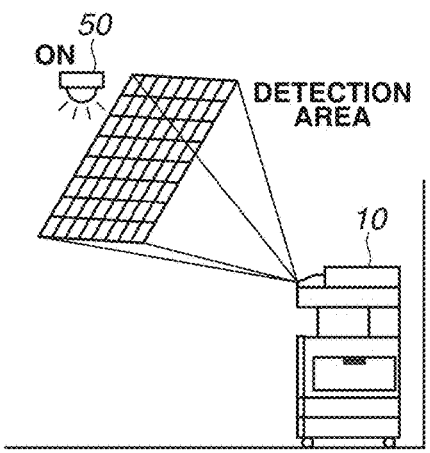
DETECTION RESULT OF
HUMAN PRESENCE SENSOR
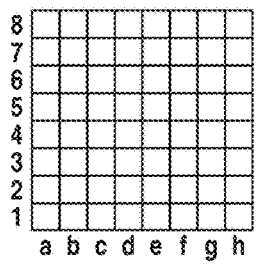
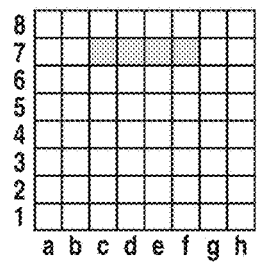
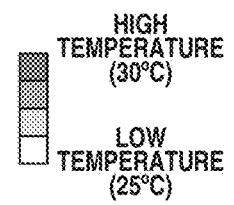

FIG.9A
USER APPROACHES FROM LEFT
FIG.9B
PASSERBY APPROACHES FROM LEFT
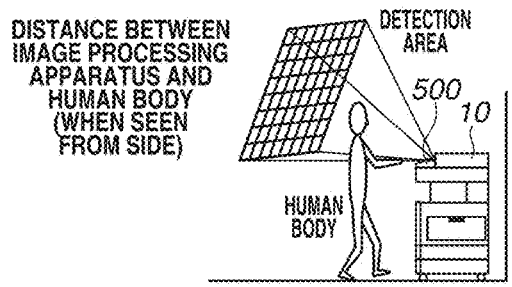
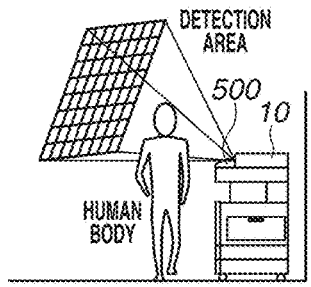
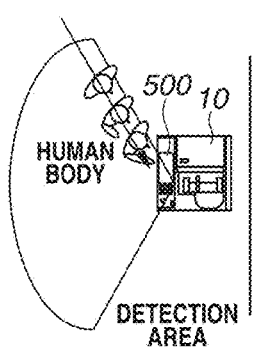
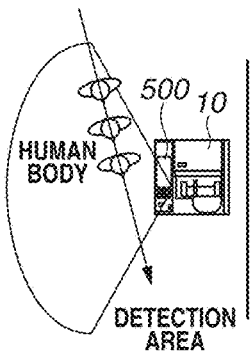
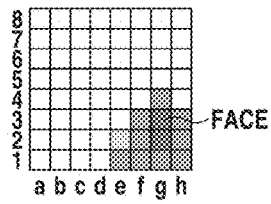
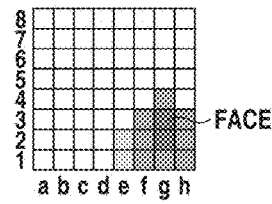
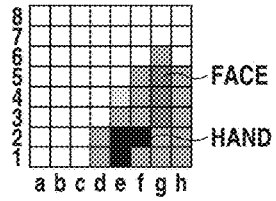
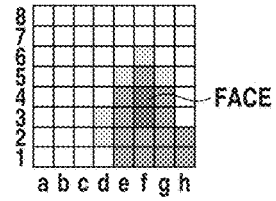
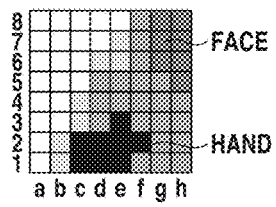
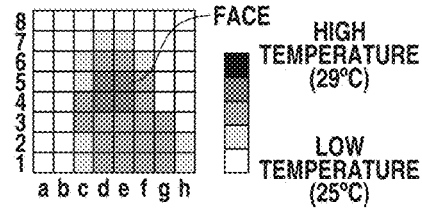

FIG.10
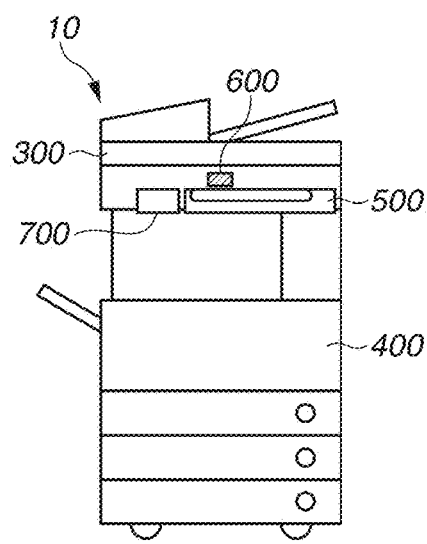
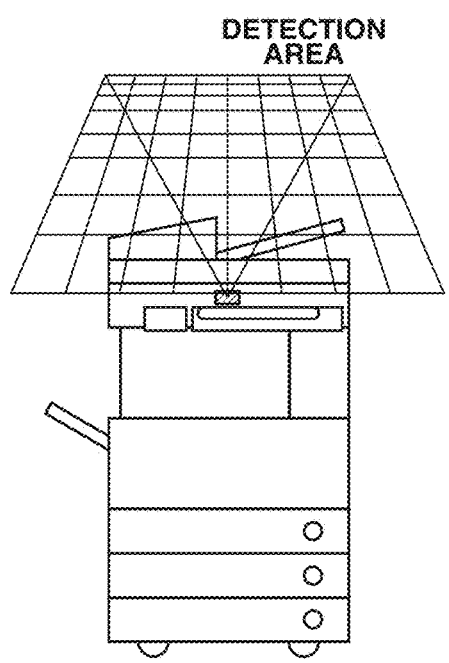
VIEW SEEN FROM FRONT
DETECTION AREA
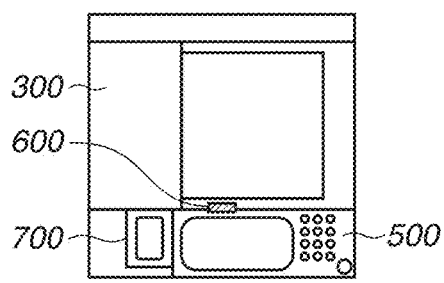
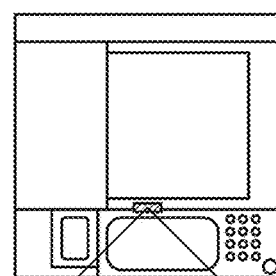
VIEW SEEN FROM ABOVE
DETECTION AREA

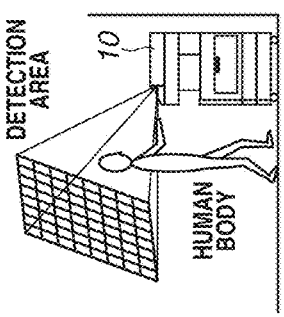
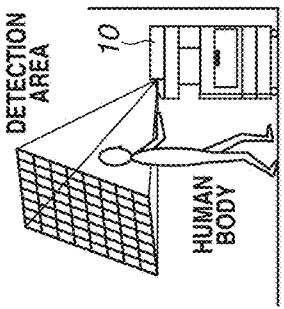
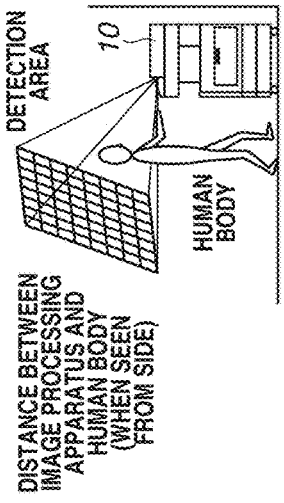
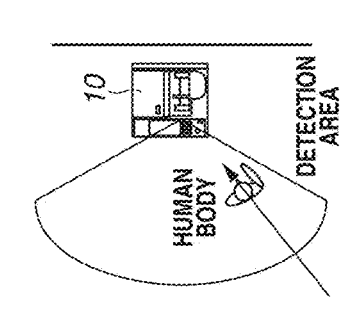
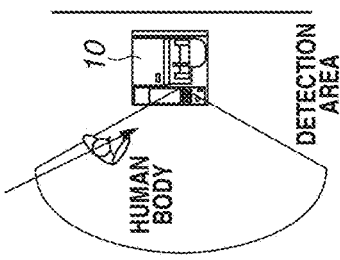
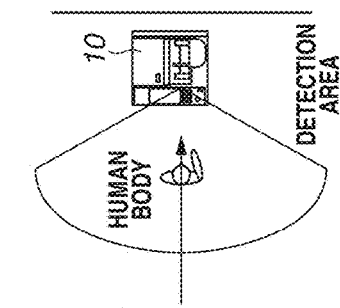
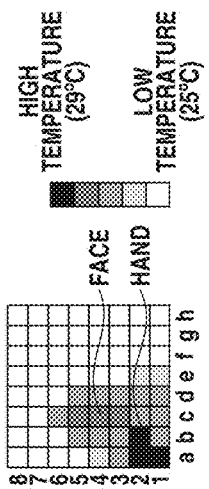
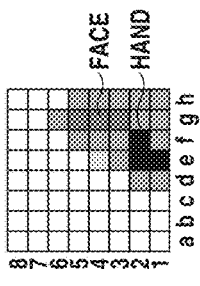
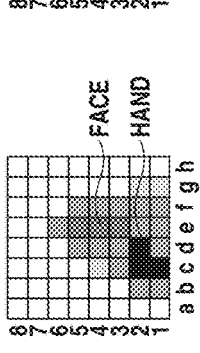

DETECTION RESULT

AFTER FILTER
PROCESSING FOR BODY

AFTER FILTER
PROCESSING FOR HAND

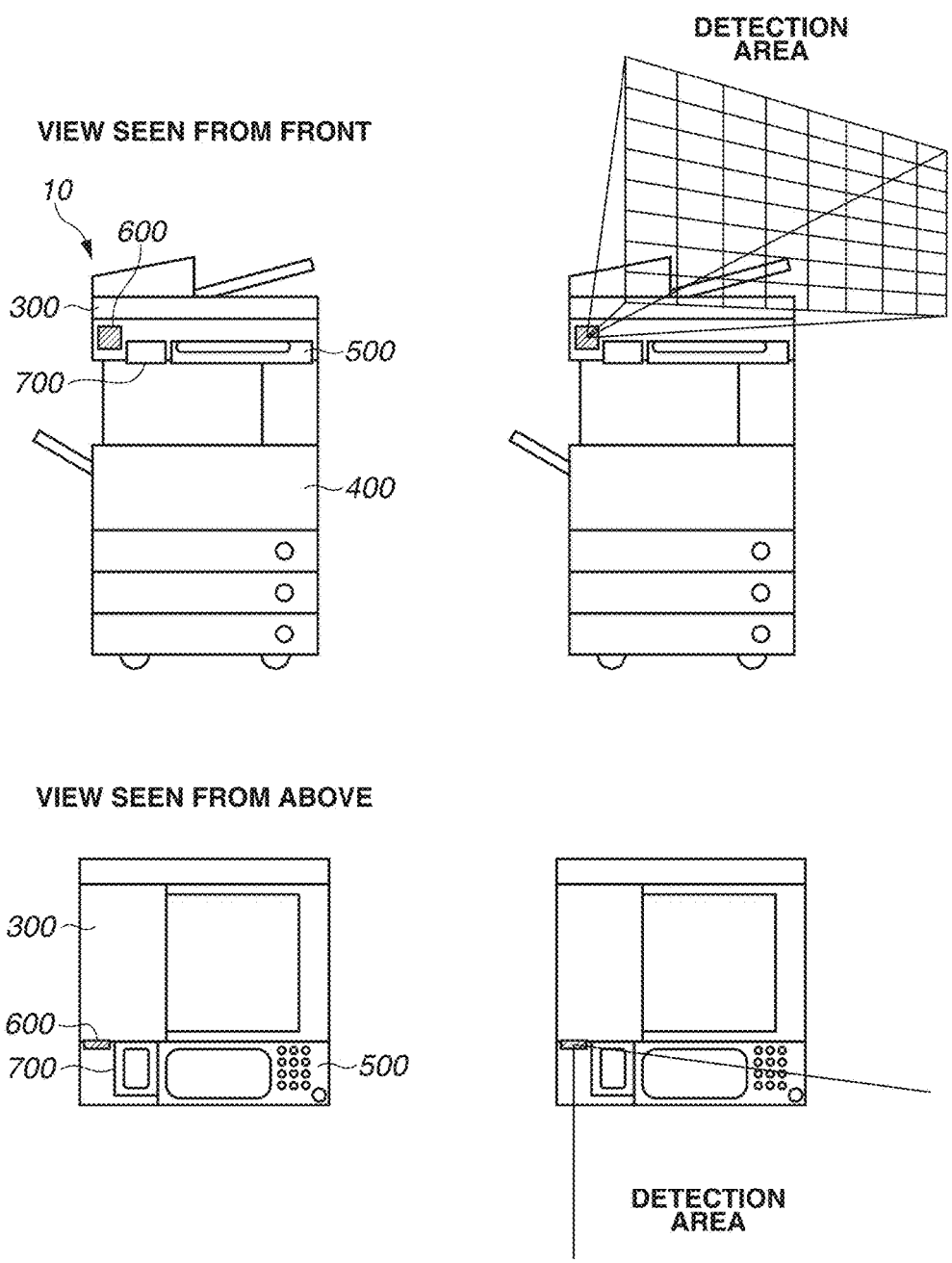

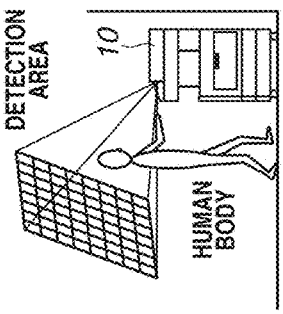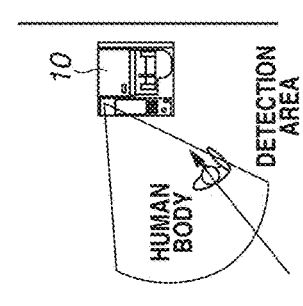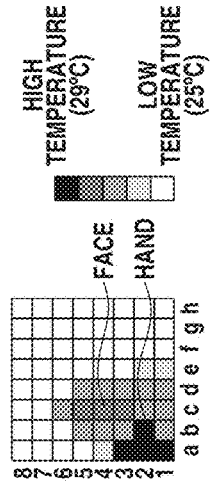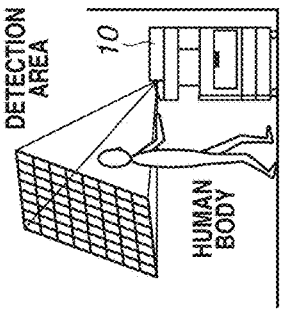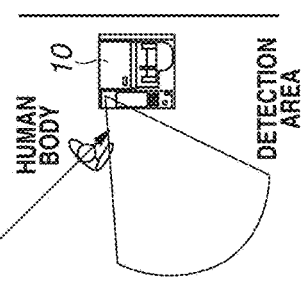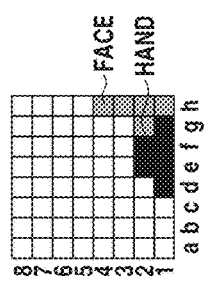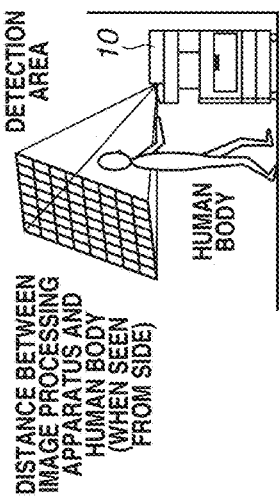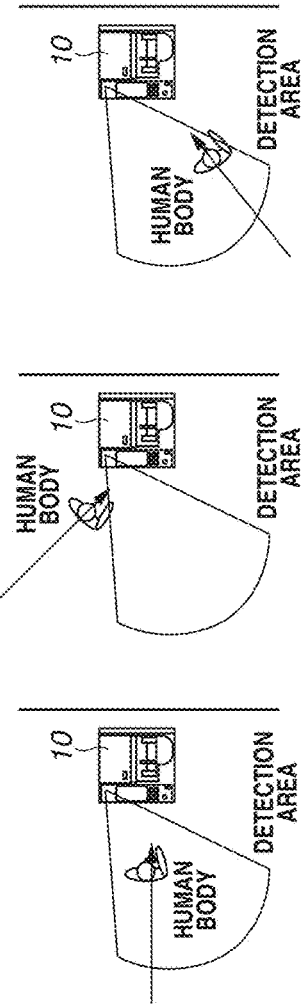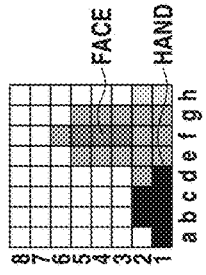

FIG.16A
ENTER DETECTION AREA
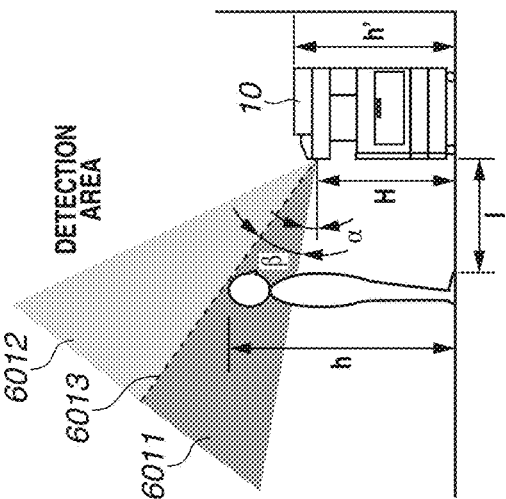
RELATIONSHIP BETWEEN HEIGHTS AND DISTANCE OF IMAGE PROCESSING APPARATUS AND HUMAN BODY
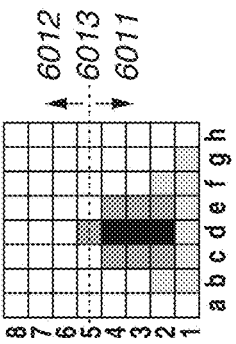
DETECTION RESULT OF HUMAN PRESENCE SENSOR
FIG.16B
REACH POWER SAVING RETURN DISTANCE
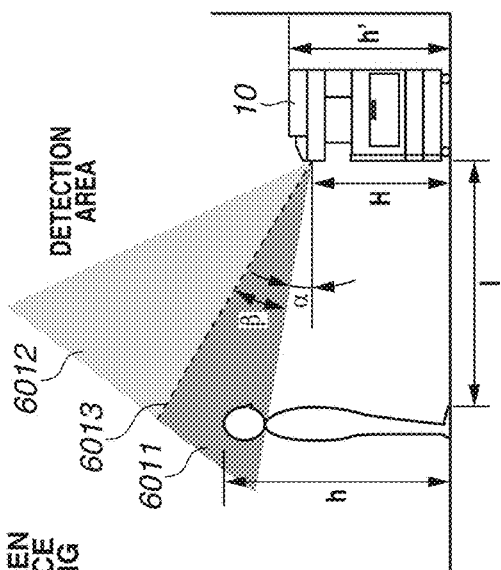
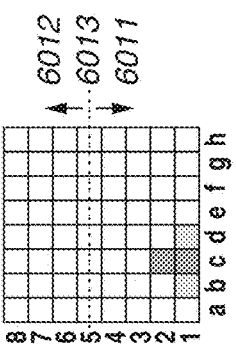

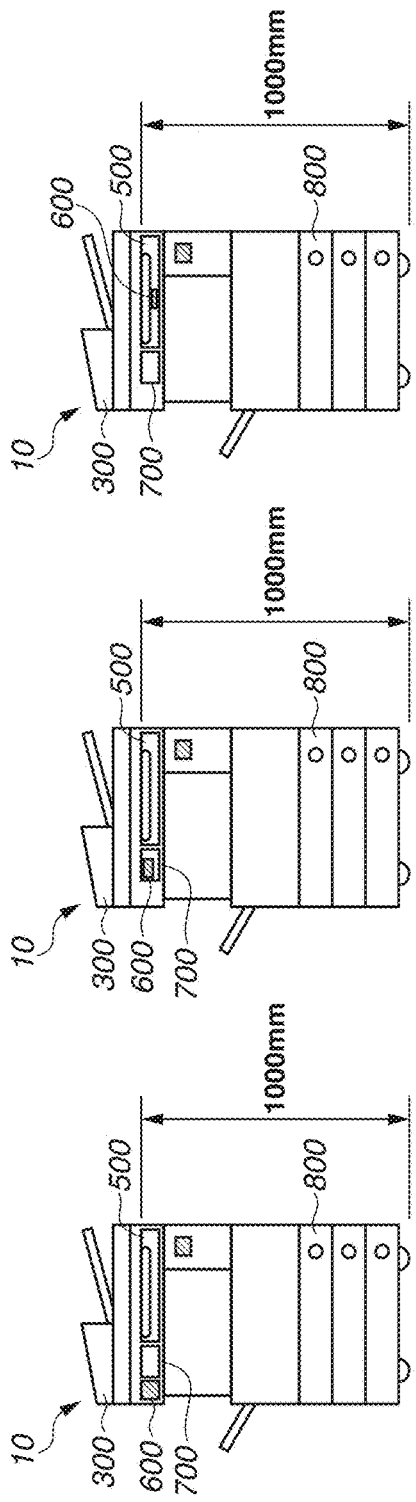

WHEN H IS HIGH

WHEN H IS LOW

IMAGE PROCESSING APPARATUS, METHOD FOR CONTROLLING IMAGE PROCESSING APPARATUS, AND RECORDING MEDIUM

BACKGROUND OF THE INVENTION

Field of the Invention

One disclosed aspect of the embodiments relates to power control of an image processing apparatus using a human presence sensor.

Description of the Related Art

Japanese Patent Application Laid-Open No. 2013-20048 discusses the use of a detection unit including a plurality of pixels arranged in a matrix to determine whether a user is holding a document. If the user is holding a document, an image processing apparatus is caused to return from a power saving state.

However, the temperature of documents to be detected by the detection unit discussed in Japanese Patent Application Laid-Open No. 2013-20048 are not much different from the ambient air temperature, and it has been difficult to determine whether a user is holding a document. According to Japanese Patent Application Laid-Open No. 2013-20048, it has thus been difficult to determine whether the person detected by the detection unit is a user of the image processing apparatus.

In view of the foregoing, the inventors have paid attention to the action of the user who intends to use an image processing apparatus. Namely, the user raises a hand in front of the image processing apparatus to operate an operation unit or hold up an authentication card.

SUMMARY OF THE INVENTION

One disclosed aspect of the embodiments is directed to an image processing apparatus that returns from a power saving state if there is a human hand in a position higher than a predetermined height.

According to an aspect of the embodiments, an image processing apparatus capable of entering a power saving state includes a detection unit configured to detect an object, a determination unit configured to determine whether there is a human hand in a position higher than a predetermined height based on a detection result of the detection unit, and a control unit configured to, if the determination unit determines that there is a human hand in the position higher than the predetermined height, make the image processing apparatus return from the power saving state.

Further features of the disclosure will become apparent from the following description of exemplary embodiments with reference to the attached drawings.

BRIEF DESCRIPTION OF THE DRAWINGS

FIG. 4 is a diagram for describing a power state of the image processing apparatus.

FIG. 5 is a diagram for describing a power state of the image processing apparatus.

FIG. 6 is a diagram illustrating an example of a detection area of a human presence sensor in a human body detection sensor unit.

FIGS. 7A, 7B, and 7C are diagrams illustrating examples of a detection result of the human presence sensor according to a distance between the image processing apparatus of the first exemplary embodiment and a human body.

FIGS. 8A and 8B are diagrams illustrating examples of the result of detection by the human presence sensor, in a case that a light such as a fluorescent light is positioned above the image processing apparatus.

FIGS. 9A and 9B are diagrams illustrating characteristics of a person who uses the image processing apparatus and a person who passes in front of the image processing apparatus.

FIG. 10 is a diagram illustrating an arrangement example of the human presence sensor which can detect a person approaching the image processing apparatus with a hand up according to the first exemplary embodiment.

FIGS. 11A, 11B, and 11C are diagrams illustrating examples of a sensor detection result when the human presence sensor is arranged in the position illustrated in FIG. 10.

FIG. 14 is a diagram illustrating an arrangement example of the human presence sensor that can detect a person approaching the image processing apparatus with a hand up according to a second exemplary embodiment.

FIGS. 15A, 15B, and 15C are diagrams illustrating examples of a sensor detection result when the human presence sensor is arranged in the position illustrated in FIG. 14.

FIGS. 16A and 16B are diagrams illustrating detection results according to a distance between the image processing apparatus and a human body.

FIGS. 18A, 18B, and 18C are diagrams illustrating examples where the human presence sensor is installed by a method described in a third exemplary embodiment.

DESCRIPTION OF THE EMBODIMENTS

Figure 1:
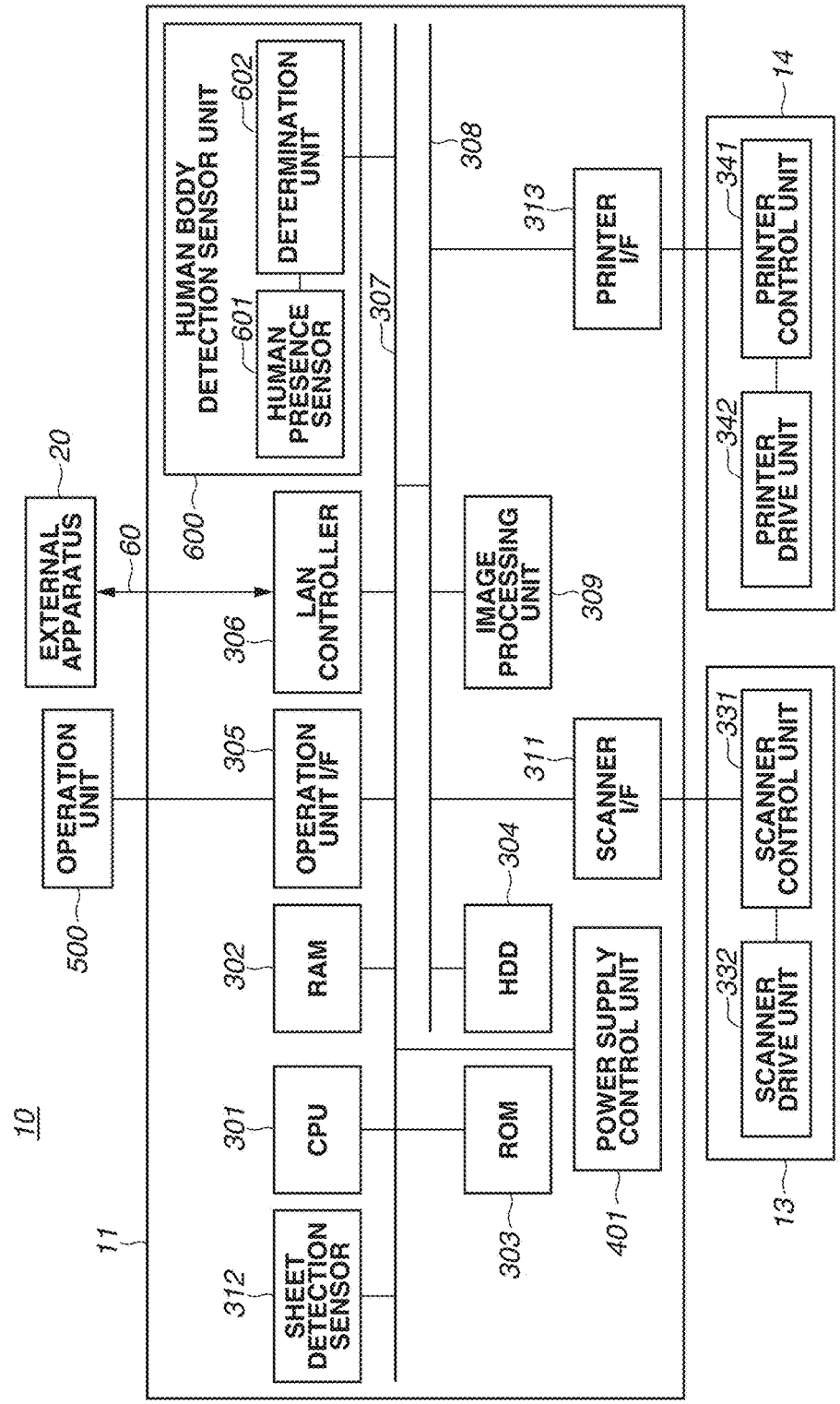
FIG. 1 is a diagram illustrating an example of a configuration of an image processing apparatus according to an exemplary embodiment.
Figure 2:
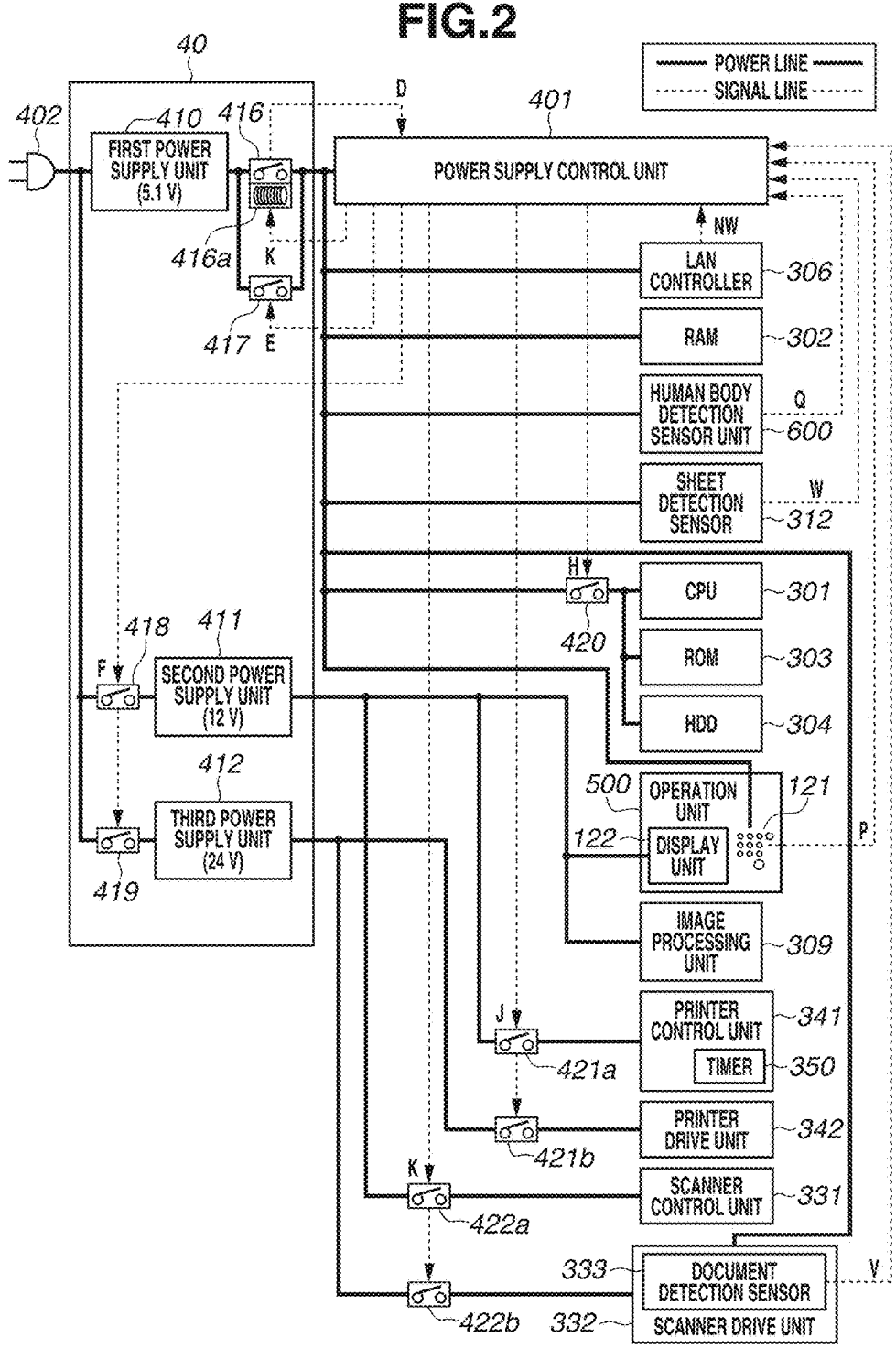
FIG. 2 is a diagram illustrating an example of a power supply circuit configuration of the image processing apparatus.

A first exemplary embodiment will be described below. FIG. 1 is a block diagram illustrating an example of a configuration of an image processing apparatus according to an exemplary embodiment. As illustrated in FIG. 1, the image processing apparatus 10 according to the present exemplary embodiment includes a controller 11, a scanner unit 13, a printer unit 14, an operation unit 500, and a power supply unit 40 which is illustrated in FIG. 2 to be described below.

The image processing apparatus 10 according to the present exemplary embodiment has at least two power modes, including a normal operation power mode (normal operation power state) for performing a copy operation and a power saving mode (power saving state) consuming power lower than that of the normal operation power mode. If a predetermined time elapses without using the image processing apparatus 10, the controller 11 performs control to shift the power mode of the image processing apparatus 10 to the power saving mode. In the power saving mode, power supply to the scanner unit 13 and the printer unit 14 is stopped, and power supply to some of the components in the controller 11 and unneeded portions in the operation unit 500 is stopped. Details will be given below.

<Description of Controller 11>

The controller 11, which controls an operation of the entire image processing apparatus 10, will be described in detail below.

As illustrated in FIG. 1, the controller 11 is electrically connected to the scanner unit 13, the printer unit 14, and the operation unit 500 described above.

The controller 11 includes a central processing unit (CPU) 301, a random access memory (RAM) 302, a read-only memory (ROM) 303, an operation unit interface (I/F) 305, a local area network (LAN) controller 306, a human body detection sensor unit 600, a sheet detection sensor 312, and a power supply control unit 401. The CPU 301, the RAM 302, the ROM 303, the operation unit I/F 305, the LAN controller 306, the human body detection sensor unit 600, the sheet detection sensor 312, and the power supply control unit 401 are connected to a system bus 307.

The controller 11 further includes a hard disk drive (HDD) 304, an image processing unit 309, a scanner I/F 311, and a printer I/F 313. The HDD 304, the image processing unit 309, the scanner I/F 311, and the printer I/F 313 are connected to an image bus 308.

The CPU 301 controls access to/from various connected devices in a comprehensive manner based on a control program stored in the ROM 303. The CPU 301 also controls various types of processing to be performed by the controller 11 in a comprehensive manner. The RAM 302 is a system work memory for allowing the CPU 301 to perform an operation. The RAM 302 also serves as a memory for temporarily storing image data. The RAM 302 includes a static random access memory (SRAM) which can retain stored contents even when the power is turned off, and a dynamic random access memory (DRAM) which erases stored contents when the power is turned off. The ROM 302 contains a boot program of the image processing apparatus 10. The HDD 304 stores system software and image data.

The operation unit I/F 305 is an interface unit for connecting the system bus 307 and the operation unit 500. The operation unit I/F 305 receives image data to be displayed on the operation unit 500 from the system bus 307 and outputs the image data to the operation unit 500. The operation unit I/F 305 outputs information input from the operation unit 500 to the system bus 307.

The LAN controller 306 controls input and output of information between the image processing apparatus 10 and an external apparatus 20 connected to a network 60.

The sheet detection sensor 312 detects that a sheet is set on a manual feed tray (not illustrated). The power supply control unit 401 controls power supply to the components of the image processing apparatus 10. The power supply control unit 401 will be described in detail below. The image bus 308 is a transmission path for exchanging image data. The image bus 308 is constituted by a Peripheral Component Interconnect (PCI) bus and/or an Institute of Electrical and Electronics Engineers (IEEE) 1394 bus.

The image processing unit 309 is configured to perform image processing. The image processing unit 309 reads image data stored in the RAM 302 and performs image processing such as enlargement and reduction according to a Joint Photographic Experts Group (JPEG) or Joint Bi-level Image Experts Group (JBIG) image and a color adjustment.

<Description of Human Body Detection Sensor Unit 600>

The human body detection sensor unit 600 includes a human presence sensor 601 and a determination unit 602. The human body detection sensor unit 600 is supplied with power from a first power supply unit 410 (FIG. 2) to be described below even in the power saving mode. The power is constantly supplied to the human presence sensor 601. Power supply to the determination unit 602 may be stopped as appropriate. However, the determination unit 602 is immediately supplied with power if the human presence sensor 601 detects a predetermined reaction.

The human presence sensor 601 is an infrared array sensor in which infrared light receiving elements for receiving infrared rays are arranged in a matrix. The human presence sensor 601 receives infrared rays radiated from a human to detect the approach of the person to the image processing apparatus 10. While in this example the human presence sensor 601 detects a human, the human presence sensor 601 can detect any object that radiates infrared rays. The human presence sensor 601 is not limited to the foregoing infrared array sensor. Devices other than an infrared array sensor may be used as long as the human presence sensor 601 can detect the approach of an object to the image processing apparatus 10. Examples include an optical sensor that detects light, a distortion sensor that deforms with physical force, a magnetic sensor that detects magnetism, and a temperature sensor that detects temperature.

The determination unit 602 processes a detection result of the human presence sensor 601 to determine the presence of a user, and outputs an energization request signal (signal Q in FIG. 2) to the power supply control unit 401 according to the detection result. If the power supply control unit 401 receives the energization request signal Q, the power supply control unit 401 returns the power mode of the image processing apparatus 10 to the normal operation power mode. Determination processing performed by the determination unit 602 will be described in detail below.

The scanner unit 13 is a device that reads an image formed on a document to obtain image data. The scanner unit 13 inputs reflection of light with which the image formed on the document is irradiated, into a charge-coupled device (CCD), thereby converting information about the image into an electrical signal. The electrical signal is converted into R, G, and B color luminance signals and output to the controller 11. The scanner unit 13 includes a scanner control unit 331 and a scanner drive unit 332. The scanner drive unit 332 is a device that includes and physically drives a paper conveyance motor for conveying a document set on a tray to a reading position of the scanner unit 13. The scanner control unit 331 controls an operation of the scanner drive unit 332. The scanner control unit 331 receives setting information through communication with the CPU 301, and controls the operation of the scanner drive unit 332 based on the setting information. The setting information is set by the user when performing scanning processing.

The printer unit 14 is a device that forms an image on a sheet by using input image data. The printer unit 14 includes a printer control unit 341 and a printer drive unit 342. The printer drive unit 342 is a device that includes and physically drives a motor for rotating a photosensitive drum, a motor for rotating a fixing unit, and a paper conveyance motor. The printer control unit 341 controls an operation of the printer drive unit 342. The printer control unit 341 receives setting information through communication with the CPU 301, and controls the operation of the printer drive unit 342 based on the setting information. The setting information is set by the user when performing print processing. The image forming method of the printer unit 14 is not limited to an electrophotographic method using a photosensitive drum or a photosensitive belt. For example, the printer unit 14 may use an inkjet method of discharging ink from a small nozzle array to make prints on a sheet, as well as other printing methods.

<Description of Power Supply Circuit Configuration of Image Processing Apparatus>

FIG. 2 is a diagram illustrating an example of a power supply circuit configuration of the image processing apparatus 10. The components of the foregoing image processing apparatus 10 are supplied with power generated by the power supply unit 40. The power supply unit 40 includes a first power supply unit 410, a second power supply unit 411, and a third power supply unit 412. The power supply unit 40 is supplied with alternating-current power from a public power source via a power plug 402.

The first power supply unit 410 converts the alternating-current power supplied via the power plug 402 into direct-current power (for example, 5.1 V (first output power)). The direct-current power is supplied to devices of a first power supply system (the power supply control unit 401, the CPU 301, the RAM 302, the ROM 303, the HDD 304, the LAN controller 306, the human body detection sensor unit 600, the sheet detection sensor 312, and buttons 121 of the operation unit 500). In the present exemplary embodiment, the CPU 301 operates on the power supplied only from the first power supply unit 410, without power supply from the second power supply unit 411 or the third power supply unit 412. In other words, the power supply of the CPU 301 is independent of the second power supply unit 411 and the third power supply unit 412.

The second power supply unit 411 converts the alternating-current power supplied via the power plug 402 into direct-current power (for example, 12 V (second output power)). The direct-current power is supplied to devices of a second power supply system (a display unit 122 of the operation unit 500, the image processing unit 309, the printer control unit 341 of the printer unit 14, and the scanner control unit 331 of the scanner unit 13).

The third power supply unit 412 converts the alternating-current power supplied via the power plug 402 into direct-current power (for example, 24 V), and supplies the direct-current power to devices of a third power supply system (the printer drive unit 342 and the scanner drive unit 332).

A power switch 416 is interposed between the first power supply unit 410 and the devices of the first power supply system. The power switch 416 is changed to an ON state or an OFF state by the user's operation. The power switch 416 inputs a signal D indicating the state (ON state or OFF state) of the power switch 416 to the power supply control unit 401. A switch 417 is also interposed between the first power supply unit 410 and the devices of the first power supply system. The switch 417 includes a field effect transistor (FET) which is arranged in parallel with the power switch 416. The switch 417 changes from an ON state to an OFF state or from the OFF state to the ON state according to a control signal E output from the power supply control unit 401. The power switch 416 includes a solenoid 416a. A voltage is applied to the solenoid 416a to change the power switch 416 to the OFF state according to a control signal K output from the power supply control unit 401.

The image processing apparatus 10 has an automatic shutdown function and a remote shutdown function. When performing such functions, the power supply control unit 401 outputs the control signal K, whereby the solenoid 416a is driven to turn off the power switch 416. The automatic shutdown function refers to a function of shutting down the image processing apparatus 10 when a predetermined time has elapsed without a user operation. The remote shutdown function refers to a function by which the image processing apparatus 10 shuts down according to a shutdown instruction transmitted from the external apparatus 20.

A relay switch 418 is interposed between the power plug 402 and the second power supply control unit 411. A relay switch 419 is interposed between the power plug 402 and the third power supply unit 412. The relay switches 418 and 419 change from an ON state to an OFF state or from the OFF state to the ON state according to a control signal F output from the power supply control unit 401.

A switch 420 is interposed between the power switch 416 and the CPU 301, ROM 303, and HDD 304. The switch 420 changes from an ON state to an OFF state or from the OFF state to the ON state according to a control signal H output from the power supply control unit 401.

A switch 421a is interposed between the second power supply unit 411 and the printer control unit 341. A switch 421b is interposed between the third power supply unit 412 and the printer drive unit 342. The switches 421a and 421b change from an ON state to an OFF state or from the OFF state to the ON state according to a control signal J output from the power supply control unit 401. The printer control unit 341 includes a timer 350, which is powered by a not-illustrated battery. The timer 350 can operate without power supply to the printer control unit 341.

A switch 422a is interposed between the second power supply unit 411 and the scanner control unit 331. A switch 422b is interposed between the third power supply unit 412 and the scanner drive unit 332. The switches 422a and 422b change from an ON state to an OFF state or from the OFF state to the ON state according to the control signal K output from the power supply control unit 401.

Power states of the image processing apparatus 10 will be described below with reference to FIGS. 3 to 5.

Figure 3:
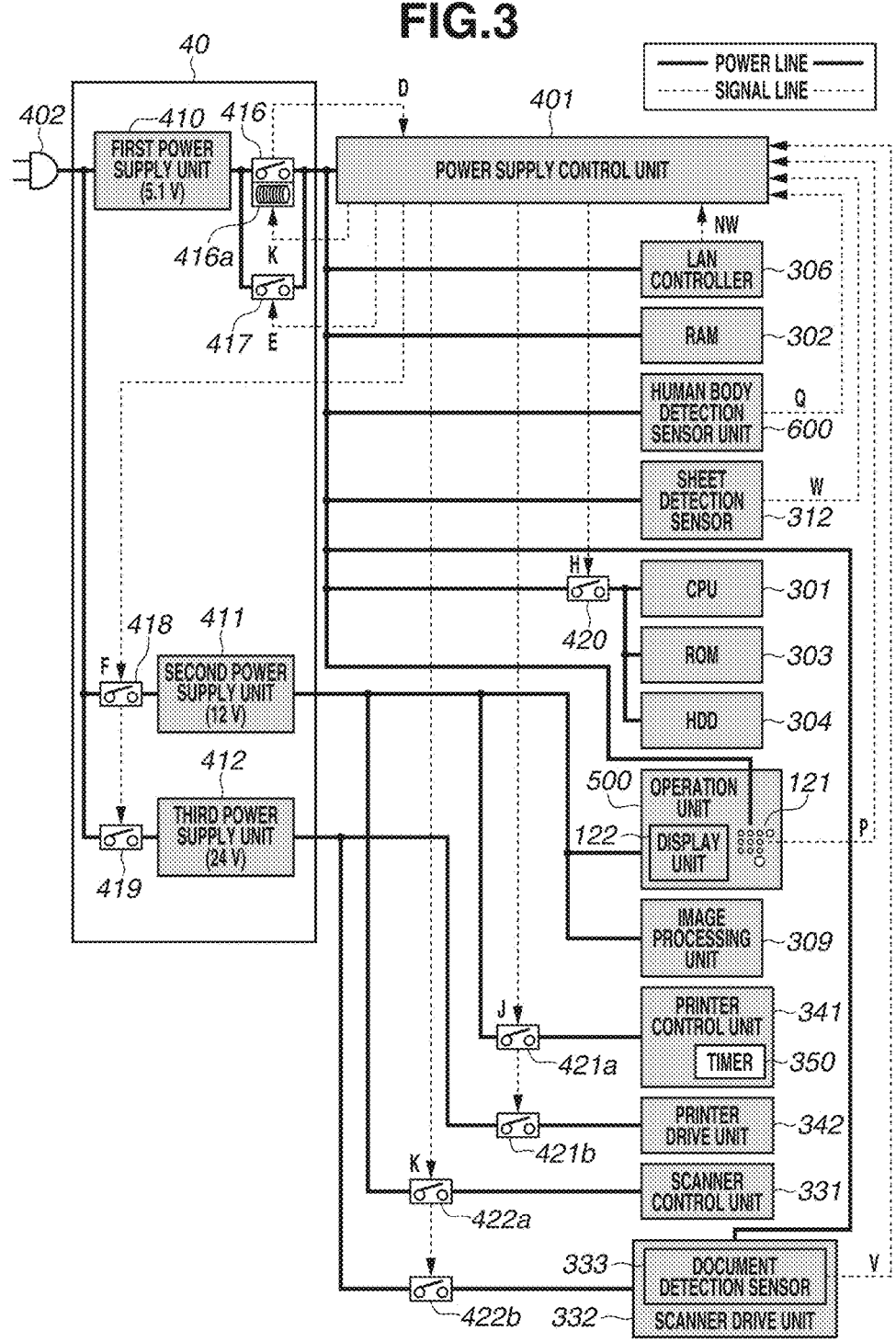
FIG. 3 is a diagram for describing a power state of the image processing apparatus.

FIGS. 3 to 5 are diagrams for describing the power states of the image processing apparatus 10. In FIGS. 3 to 5, portions not supplied with power are shaded.

(1) Power off State

As illustrated in FIG. 3, a power off state is a state in which the components of the image processing apparatus 10 are not supplied with power. In the power off state, the switches 416 to 422b are in the OFF state. The power off state may be a hibernation state.

(2) Normal Operation Power Mode

As illustrated in FIG. 4, the normal operation power mode refers to a state in which the components of the controller 11, the operation unit 500, the printer unit 14, and the scanner unit 13 are supplied with power. Specifically, in the normal operation power mode, the switches 416 to 422b are in the ON state.

(3) Power Saving Mode

In the power saving mode, as illustrated in FIG. 5, the power supply control unit 401, the RAM 302, the LAN controller 306, the human body detection sensor unit 600, the sheet detection sensor 312, a document detection sensor 333, and the buttons 121 of the operation unit 500 are supplied with power. In the power saving mode, the CPU 301, the ROM 303, the HDD 304, the image processing unit 309, the scanner unit 13, and the printer unit 14 are not supplied with power. In the power saving mode, the first power supply unit 410 supplies power to the devices of the first power supply system (the power supply control unit 401, the RAM 302, the LAN controller 306, the human body detection sensor unit 600, the sheet detection sensor 312, the document detection sensor 333, and the buttons 121). In the power saving mode, as illustrated in FIG. 5, the switches 416 and 417 are in the ON state, and the other switches 418 to 422b are in the OFF state. In the power saving mode, the user's operations on the buttons 121 of the operation unit 500 can be accepted. In the power saving mode, the LAN controller 306 can receive packets transmitted from the external apparatus 20. In the power saving mode, the human body detection sensor unit 600 can detect the approach of a person to the image processing apparatus 10. In the power saving mode, the sheet detection sensor 213 can detect that a sheet is set on the manual feed tray. In the power saving mode, the document detection sensor 333 can detect that a document is set on the tray.

The image processing apparatus 10 may have other power modes.

For example, suppose that in the power saving mode, the LAN controller 306 receives a packet that the LAN controller 306 is not able to respond to only by itself (excluding a page description language (PDL) job). In such a case, the image processing apparatus 10 shifts from the power saving mode to a response mode (not illustrated). The response mode is a power state in which the switch 420 is changed from the state of the foregoing power saving mode to the ON state and the first power supply unit 410 supplies power to the CPU 301, the ROM 303, and the HDD 304. In the response mode, the CPU 301 can respond to the packet that is received by the LAN controller 306 and to which the LAN controller 306 is not able to respond to by itself, by using information stored in the HDD 304. The image processing apparatus 10 shifted to the response mode processes the packet and then enters the power saving mode.

When the timer 350 included in the printer control unit 341 has counted a predetermined time in the power saving state, the image processing apparatus 10 enters an adjustment mode (not illustrated). The adjustment mode is a state which the image processing apparatus 10 enters to prevent the photosensitive drum and a blade for scraping off toner from the photosensitive drum, from making contact with each other in the same position for a long time. When shifted to the adjustment mode, the image processing apparatus 10 rotates the photosensitive drum to change the relative position between the photosensitive drum and the blade. In the adjustment mode, the printer control unit 341 and the printer drive unit 342 are supplied with power. The CPU 301 and the HDD 304 are not supplied with power. In the adjustment mode, the switches 416, 417, 418, 419, 421a, and 421b are in the ON state, and the switches 420, 422a, and 422b are in the OFF state. The image processing apparatus 10 performs a specific operation (e.g., rotation of the photosensitive drum) in the adjustment mode and then enters the power saving mode again.

The power supply control unit 401 will be described below.

An example of the power supply control unit 401 is a complex programmable logic device (CPLD). The power supply control unit 401 controls the shift of the image processing apparatus 10 to the foregoing power states. The power supply control unit 401 is supplied with power in the power saving mode, and detects a plurality of types of return factors from the power saving mode.

The power supply control unit 401 receives a signal NW as a return factor from the LAN controller 306. The signal NW is output to the power supply control unit 401 when the LAN controller 306 receives a PDL job.

The power supply control unit 401 receives a signal P as a return factor from the buttons 121 of the operation unit 500. The signal P is output to the power supply control unit 401 when the buttons 121 are operated by the user. The power supply control unit 401 receives a signal Q as a return factor from the human body detection sensor unit 600. The signal Q is output to the power supply control unit 401 when the human body detection sensor unit 600 detects the approach of a person to the image processing apparatus 10.

The power supply control unit 401 receives a signal V as a return factor from the document detection sensor 333. The signal V is output to the power supply control unit 401 when the document detection sensor 333 detects a document. The power supply control unit 401 receives a signal W as a return factor from the sheet detection sensor 312 arranged on the manual feed tray. The signal W is output to the power supply control unit 401 when a sheet is set on the manual feed tray.

The power supply control unit 401 changes the states of the switches 417 to 422b to the ON state or the OFF state based on the logic of the foregoing return factors (signals NW, P, Q, V and W).

If the signal NW is input, the power supply control unit 401 serving as a signal output unit outputs the control signals E, F, K, J, and H (changes the signal levels to "high"). As a result, the image processing apparatus 10 enters the normal operation power mode.

Similarly, if the signal P, Q, V, or W is input to the power supply control unit 401, the power supply control unit 401 outputs the control signals E, F, K, J, and H (changes the signal levels to "high"), and the image processing apparatus 10 enters the normal operation power mode.

The signal D indicating the state of the power switch 416 is input to the power supply control unit 401. If the power switch 416 is changed to the OFF state by the user's operation, the signal D is input to the power supply control unit 401. If the signal D is input, the power supply control unit 401 outputs the control signals E, F, H, J, and K (changes the signal levels to "high"). As a result, the image processing apparatus 10 enters the power off state.

A human body detection operation of the human body detection sensor unit 600 will be described below with reference to FIG. 6.

FIG. 6 is a diagram illustrating an example of a detection area of the human presence sensor 601 of the human body detection sensor unit 600.

The human presence sensor 601 according to the present exemplary embodiment is an infrared array sensor. For example, the human presence sensor 601 is a sensor in which a plurality of infrared light receiving elements (infrared sensors) is arranged in an M×N matrix. M and N are natural numbers and may have the same value. The arrangement of the plurality of infrared light receiving elements is not limited to an M×N matrix. Other arrangements may be used.

The infrared array sensor serving as the human presence sensor 601 receives infrared rays radiated from a heat source such as a human body with each of the infrared light receiving elements (infrared sensors) which are, for example, arranged in a matrix. The human presence sensor 601 then, as its characteristics, identifies the shape (detection region) of the heat source as a temperature distribution by using temperature values based on the amounts of infrared rays (light reception results) received by the respective infrared light receiving elements. The human presence sensor 601 can detect an object in a space extending radially from its detection surface (surface where the infrared light receiving elements are arranged) with the detection surface. Using such characteristics of the human presence sensor 601, the image processing apparatus 10 detects the temperature distribution of a heat source approaching the image processing apparatus 10, and determines whether the heat source is a human body based on the shape and temperature. To most surely detect human body temperature, exposed skin portions should be detected so that higher accuracy is achieved. The detection area of the human presence sensor 601 is thus set to be forward (to the left in FIG. 6) and obliquely upward from the main body part of the image processing apparatus 10 so that the temperature of a human face can be detected. In other words, the human presence sensor 601 is arranged with the detection surface obliquely upward from the image processing apparatus 10. By directing the human presence sensor 601 forward and obliquely upward, the detection of heat of another apparatus 20 placed in front of the image processing apparatus 10, a PC or a monitor 30 on a desk, or a person sitting on a chair can be prevented. The human presence sensor 601 is arranged to detect an object entering the detection area from within a predetermined distance and above a predetermined height (for example, a height based on the operation unit 500).

The human presence sensor 601 can output an interrupt signal when any of the M×N infrared light receiving elements exceeds a preset temperature. If the determination unit 602 receives the interrupt signal, the determination unit 602 reads a register in the human presence sensor 601. The determination unit 602 can thereby identify which of the light receiving elements has detected the temperature beyond the preset temperature. The image processing apparatus 10 uses the interrupt function of the human presence sensor 601 to start the energization and operation of the determination unit 602. The determination unit 602 may be constantly energized to perform the operation for reading the detection result of the human presence sensor 601 at regular time intervals.

FIGS. 7A to 7C are diagrams illustrating examples of the detection result of the human presence sensor 601 according to a distance between the image processing apparatus 10 of the first exemplary embodiment and a human body.

FIGS. 7A to 7C each illustrate the distance between the main body of the image processing apparatus 10 and the human body on the upside, and the detection result of the infrared array sensor at the distance on the downside.

The present exemplary embodiment deals with an example where an infrared array sensor is used as the human presence sensor 601 which includes a total of 64 infrared light receiving elements arranged in eight rows 1 to 8 and eight columns a to h. In the following description, the positions of the respective infrared light receiving elements of the human presence sensor 601 will be denoted as elements 1a to 8h.

FIG. 7A illustrates a situation where the human body enters a distance detectable by the human presence sensor 601. The detection result of the human presence sensor 601 shows that a heat source is detected in several lower positions including elements 1c, 1d, 1e, and 2d. FIG. 7B illustrates a situation where the human body further approaches the image processing apparatus 10. Here, the detection result of the human presence sensor 601 shows that the temperature-detected region spreads upward from the first row at the bottom to the second, third, fourth, and fifth rows above, and laterally from the d column to the c and e columns, b and f columns, and a and h columns. FIG. 7C illustrates a situation where the human body comes close enough to use the image processing apparatus 10. Here, the detection result of the human presence sensor 601 shows that the temperature-detected region spreads to most of the infrared light receiving elements of the human presence sensor 601. In such a case, temperature is detected even in the first and second rows at the bottom.

FIGS. 8A and 8B are diagrams illustrating results of detection by the human presence sensor 601, in a case that a light 50 such as a fluorescent light is above the image processing apparatus 10.

When the light 50 is OFF, as illustrated in FIG. 8A, the human presence sensor 601 does not detect a heat source. If the light 50 is turned ON, as illustrated in FIG. 8B, the human presence sensor 601 detects the fluorescent light as a heat source. In this case, the heat source is detected in the upper portions of the infrared light receiving elements at the fifth to eighth rows from the bottom. In other words, the bottommost infrared light receiving elements at the first row do not detect upper heat sources such as the light 50. If the area where the heat source is initially detected does not include the infrared light receiving elements of the first row at the bottom, the image processing apparatus 10 therefore determines that the detected heat source is other than a human body. In such a case, the image processing apparatus 10 does not perform a determination operation for changing the power mode of the image processing apparatus 10.

FIGS. 9A and 9B are diagrams illustrating characteristics of a person who uses the image processing apparatus 10 (user) and a person who only passes in front of the image processing apparatus 10 (passerby).

FIG. 9A illustrates a case where the user approaches the image processing apparatus 10 from the left. FIG. 9B illustrates a case where the passerby passes from the left to the right. FIGS. 9A and 9B each include a side view of the distance between the main body part of the image processing apparatus 10 and the human body in the top part, a top view of the position of the human body with respect to the main body part of the image processing apparatus 10 in the middle part, and the detection result of the human presence sensor 601 frame by frame in the bottom part.

The detection results of the human presence sensor 601 in FIGS. 9A and 9B show little difference from each other in the first frame. A clear difference appears in and after the second frame. In the case of the user illustrated in FIG. 9A, a hand appears as a heat source in the lower portion of the detection region (elements 2e, 2f, and 1e). This is because the person approaches the image processing apparatus 10 raising a hand to the height of the operation unit 500 with the intention of touching the operation unit 500, to immediately operate the image processing apparatus 10. Further, some user may approach the apparatus with a hand holding a document at the height of the document tray of the scanner unit 13 to set the document on the document tray. Alternatively, some user may approach the apparatus with a hand holding an integrated circuit (IC) card at the height of an authentication unit 700 (which is, for example, arranged next to the operation unit 500) to touch the authentication unit 700 with the IC card. Such users can be detected if heat sources above the operation unit 500 can be detected. Although not illustrated in FIG. 2, the authentication unit 700 is supplied with power from the first power supply unit 410 (FIG. 2). If the authentication unit 700 is touched by an IC card in the power saving mode, the authentication unit 700 outputs a signal (not illustrated) to the power supply control unit 401, and the image processing apparatus 10 recovers from the power saving mode.

On the other hand, in a case of a passersby, it rarely walks with their hands above the operation unit 500, and the human presence sensor 601 directed above the operation unit 500 will not detect the hands. In the present exemplary embodiment, such characteristics of the user and the passerby are utilized to determine the user and the passerby.

FIG. 10 is a diagram illustrating an arrangement example of the human presence sensor 601 that can detect that a person approaches the image processing apparatus 10, raising its hand.

In the example of FIG. 10, the human body detection sensor unit 600 is arranged in a lateral center position of the image processing apparatus 10 when seen from the front. The human body detection sensor unit 600 is arranged at the back of the operation unit 500, so that the heat of a hand which is going to touch the operation unit 500 can be detected. The user who starts to use the image processing apparatus 10 would touch the operation unit 500, the scanner unit 13, or the authentication unit 700. The human body detection sensor unit 600 is arranged so that the hand raised to touch any of such units comes within the detection area of the human presence sensor 601.

FIGS. 11A to 11C are diagrams illustrating examples of the detection result of the human presence sensor 601 when the human presence sensor 601 is arranged in the position illustrated in FIG. 10.

FIGS. 11A to 11C each illustrate a side view of the distance between the main body part of the image processing apparatus 10 and the human body in the top portion, a top view of the distance between the main body part of the image processing apparatus 10 and the human body in the middle portion, and the detection result of the infrared array sensor at the distance in the bottom portion.

FIG. 11A illustrates a case where the human body approaches the image processing apparatus 10 from the front. FIG. 11B illustrates a case where the human body approaches the image processing apparatus 10 from the left. FIG. 11C illustrates a case where the human body approaches the image processing apparatus 10 from the right.

The human presence sensor 601 arranged in the position illustrated in FIG. 10 can detect the user's hand by the bottom area of the human presence sensor 601 both when the user raising the hand approaches the image processing apparatus 10 from the front and when the user approaches the image processing apparatus 10 from either the left or the right side.

A method for extracting the user's hand from the detection result of the human presence sensor 601 will be described below with reference to FIGS. 12 and 13.

Figure 12:
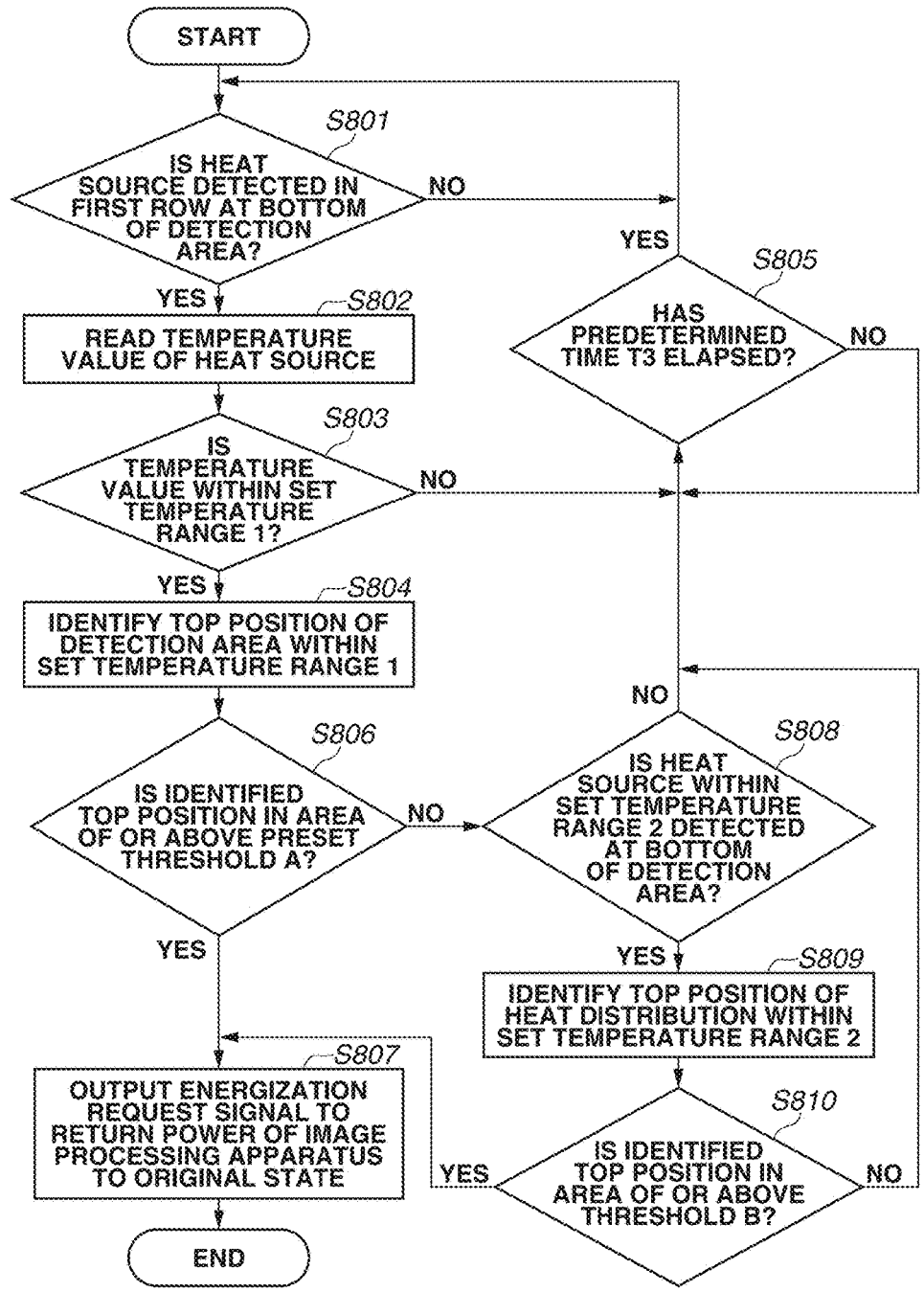
FIG. 12 is a flowchart illustrating an example of determination processing by a determination unit.
Figure 13A:
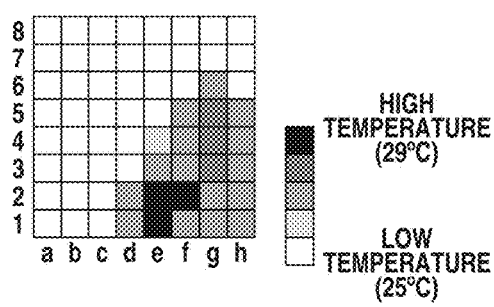
FIGS. 13A, 13B, and 13C are diagrams for describing filter processing when performing the determination processing.

FIG. 12 is a flowchart showing an example of the determination processing by the determination unit 602.

FIG. 13 is a diagram for illustrating filter processing when performing the determination processing.

The infrared array sensor of the human presence sensor 601 receives infrared rays and detects temperature according to the intensity of the infrared rays. The amount of infrared rays received from a heat source of the same temperature varies depending on the distance in the detection. A heat source detected from a long distance has a temperature lower than the actual temperature due to attenuation of the infrared rays, while a heat source detected at a nearer distance has a temperature closer to the actual temperature. Owing to such characteristics, detected hands have a highest temperature in the body because the hands are situated closest to the human presence sensor 601 and are usually exposed without being covered by clothes.

The processing of the flowchart of FIG. 12 is carried out, for example, by the determination unit 602 including a processor reading and executing a program stored in a storage device such as a not-illustrated ROM. The determination unit 602 reads values detected by each infrared light receiving element of the human presence sensor 601 and performs the following processing.

First, in step S801, the determination unit 602 determines whether a heat source detected by the human presence sensor 601 is in the first row at the bottom of the detection area of the human presence sensor 601. That is, the determination unit 602 determines whether the heat source is detected by an infrared light receiving element in the first row at the bottom of the infrared array sensor of the human presence sensor 601. If it is determined that there is no heat source at the bottom of the detection area (NO in step S801), the determination unit 602 determines that a human body is not detected (for example, an object other than a human body, like the light 50 of FIG. 8, is detected) and repeats the processing of step S801.

On the other hand, if it is determined that there is a heat source at the bottom of the detection area (YES in step S801), then in step S802, the determination unit 602 reads the temperature value of the heat source. In step S803, the determination unit 602 determines whether the temperature value of the heat source read in the foregoing step S802 is within a preset set temperature range 1 (for example, at or above approximately 27° C. which is presumed to be a body temperature detected through clothes).

If the temperature value of the heat source is determined to not be a temperature within the set temperature range 1 (NO in step S803), the processing returns to step S801 after a lapse of a predetermined time T3 (after it is determined to be YES in step S805).

Figure 13B:
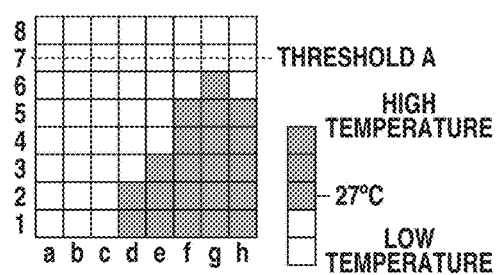
Figure 13C:
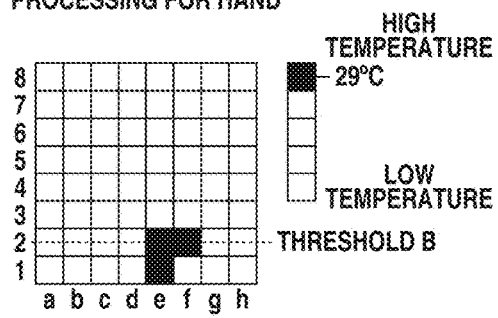

On the other hand, if the temperature value of the heat source is determined to be a temperature within the set temperature range 1 (YES in step S803), then in step S804, the determination unit 602 estimates that the detected heat is a body temperature, and identifies the topmost position of the detection area (body temperature area) within the foregoing set temperature range 1. For example, the determination unit 602 performs filter processing on a detection result illustrated in FIG. 13A to binarize the detection result depending on whether temperature is higher than or equal to 27° C. as illustrated in FIG. 13B. Based on the result of the filter processing, the determination unit 602 identifies the top position of the area of 27° C. or higher.

In step S806, the determination unit 602 determines whether the top position identified in the foregoing step S804 is in an area of or above a preset threshold A (for example, the seventh row of the infrared array sensor) (i.e., in the area of the seventh and eight rows of the infrared array sensor).

If the top position identified in the foregoing step S804 is determined to be in the area of or above the preset threshold A (YES in step S806), the processing proceeds to step S807. In step S807, the determination unit 602 outputs the energization request signal (signal Q in FIG. 2) to the power supply control unit 401 to change the power state of the image processing apparatus 10, and ends the processing of the present flowchart. In such a manner, the image processing apparatus 10 can shift from the power saving mode to the normal operation power mode if the user comes sufficiently close to the image processing apparatus 10 even with hands down.

On the other hand, if the top position identified in the foregoing step S804 is determined to not be in the area of or above the preset threshold A (NO in step S806), the processing proceeds to step S808. Since many users approach the image processing apparatus 10 raising a hand, the determination unit 602, in step S808 and subsequent steps, determines whether a hand is raised before the area of the threshold A is exceeded. A specific description is given below.

In step S808, the determination unit 602 determines whether a heat source within a set temperature range 2 which is higher than the lower limit of the set temperature range 1 (for example, at or above approximately 29° C. which is a body temperature presumed to be detected from exposed skin of a hand) is detected at the bottom of the detection area of the human presence sensor 601. In other words, the determination unit 602 determines whether temperature corresponding to a human hand is detected at the bottom of the detection area of the human presence sensor 601. At this time, to determine whether a hand is detected, the determination unit 602 performs filter processing on the detection result illustrated in FIG. 13A and binarizes the detection result depending on whether the temperature is higher than or equal to 29° C. as illustrated FIG. 13C. Based on the result of the filter processing, the determination unit 602 identifies the detection region of a heat source which has a 29° C. or higher temperature to check whether the identified heat source of 29° C. or higher lies at the bottom of the detection area of the human presence sensor 601.

If it is determined that there is no detection region of a heat source within the set temperature range 2 which is higher than the lower limit of the set temperature range 1 at the bottom of the detection area (NO in step S808), the determination unit 602 determines that the heat source is not a human body. The processing then proceeds to step S805.

On the other hand, if it is determined that there is a detection region of a heat source within the set temperature range 2 which is higher than the lower limit of the set temperature range 1 at the bottom of the detection area (YES in step S808), the determination unit 602 determines that the heat source is likely to be a hand. The processing then proceeds to step S809. In step S809, the determination unit 602 identifies the top position of the heat distribution (detection region) within the set temperature range 2 determined in the foregoing step S808.

In step S810, the determination unit 602 determines the top position of the heat distribution within the set temperature range 2 identified in the foregoing step S809 is in an area of or above a threshold B (the second row of the infrared array sensor). If the top position of the heat distribution within the set temperature range 2 identified in the foregoing step S809 is determined to not be in the area of or above the threshold B (NO in step S810), the processing proceeds to step S805.

On the other hand, if the top position of the heat distribution within the set temperature range 2 identified in the foregoing step S809 is determined to be in the area of or above the threshold B (YES in step S810), the processing proceeds to step S807. In step S807, the determination unit 602 outputs the energization request signal (signal Q in FIG. 2) to the power supply control unit 401 to change the power state of the image processing apparatus 10, and ends the processing of the present flowchart. In such a manner, the human presence sensor 601 can be used to detect that a person approaches raising a hand above the operation unit 500. The person approaching the image processing apparatus 10 with the raised hand can thus be detected as a user intending to operate the image processing apparatus 10 at an earlier stage.

By the processing described above, it can be accurately and flexibly determined whether a person approaching the image processing apparatus 10 has an intention to operate the apparatus, and power control of the image processing apparatus 10 can be carried out at an earlier stage. Thus, power consumption can be reduced and convenience of the image processing apparatus 10 can be improved in a compatible manner. Specifically, the characteristics of an approaching person who intends to operate the apparatus can be captured by detecting, for example, that the person's hand is above the operation unit 500, so that it can be determined whether the person is a user intending to operate the apparatus or just a passerby, even if it does not match previously stored reference information. As a result, the power state of the image processing apparatus 10 can be switched at an earlier stage, which improves the convenience of the image processing apparatus 10.

As a second exemplary embodiment, an example where the human body detection sensor unit 600 is arranged in a position different from the first exemplary embodiment will be described. The configuration of the main body of the image processing apparatus 10 and the determination processing are slimier to those of the first exemplary embodiment. A description thereof will thus be omitted.

FIG. 14 is a diagram illustrating an arrangement example of the human presence sensor 601 that can detect that a person approaches the image processing apparatus 10 with a hand up according to the second exemplary embodiment.

In the example of FIG. 14, the human body detection sensor unit 600 is arranged in a left position of the image processing apparatus 10. The human body detection sensor unit 600 is arranged on the far side of the operation unit 500 so that the heat of a hand which is going to touch the operation unit 500 can be detected. The user who starts to use the image processing apparatus 10 would touch the operation unit 500, the scanner unit 13, or the authentication unit 700. The human body detection sensor unit 600 is arranged so that the hand raised to touch any of such units falls within the detection area of the human presence sensor 601.

FIGS. 15A to 15C are diagrams illustrating examples of the detection result of the human presence sensor 601 when the human presence sensor 601 is arranged in the position illustrated in FIG. 14.

FIGS. 15A to 15C each illustrate a side view of the distance between the main body part of the image processing apparatus 10 and a human body in the top, a top view showing the distance between the main body part of the image processing apparatus 10 and the human body in the middle, and the detection result of the infrared array sensor at the distance in the bottom.

FIG. 15A illustrates a case where the human body approaches the image processing apparatus 10 from the front. FIG. 15B illustrates a case where the human body approaches the image processing apparatus 10 from the left. FIG. 15C illustrates a case where the human body approaches the image processing apparatus 10 from the right.

As in the foregoing first exemplary embodiment, if the human body detection sensor unit 600 is arranged in the lateral center position of the image processing apparatus 10, the hand is detected in front of the body. In the second exemplary embodiment, the human body detection sensor unit 600 is arranged in a lateral left position of the image processing apparatus 10. In such a case, the body and the hand can be detected in separate positions if the user approaches from the front or from the left of the image processing apparatus 10. As a result, the human body detection sensor unit 600 can make an accurate determination about the detection of the hand in the bottom region of the detection area of the human presence sensor 601. This example deals with the case where the human body detection sensor unit 600 is arranged on the left part of the main body of the image processing apparatus 10. A similar effect can be obtained owing to symmetrical detection by the sensor if the human body detection sensor unit 600 is arranged on the right part of the main body of the image processing apparatus 10.

As described above, according to the second exemplary embodiment, the position of the human hand can be accurately determined, in addition to the effects described in the first exemplary embodiment. This enables power control with fewer misjudgments.

As in the foregoing first and second exemplary embodiments, if the human presence sensor 601 is used for human detection, exposed skin portions need to be detected to reliably detect the human body temperature. The human presence sensor 601 therefore needs to be installed directed forward and obliquely upward (in a user direction and obliquely upward) from the front of the image processing apparatus 10. The installation position and installation angle of the human presence sensor 601 need to be appropriately set, or the detection area of the human presence sensor 601 fails to cover exposed skin portions and the intended heat source can be buried within surrounding temperatures, which causes a false detection. The following third exemplary embodiment will deal with a configuration that can determine an appropriate installation position and installation angle of the human presence sensor 601 and thereby detect a person approaching the image processing apparatus 10 in an appropriate position which can reduce false detections.

FIGS. 16A and 16B are diagrams illustrating detection results of the human presence sensor 601 according to the distance between the image processing apparatus 10 and a human body.

FIGS. 16A and 16B each illustrate the distance between the image processing apparatus 10 and the human body, in the top, and the detection result of the infrared array sensor obtained at the distance, in the bottom.

FIG. 16A illustrates a situation where the human body enters the distance detectable by the human presence sensor 601. The detection result of the human presence sensor 601 shows that a heat source is detected in several lower positions including elements 1c, 1d, 1e, and 2d. FIG. 16B illustrates a situation where the human body approaches the image processing apparatus 10. The detection result of the human presence sensor 601 shows that the temperature-detected region spreads upward from the first row to the second, third, fourth, and fifth rows above, and laterally spreads from the d column to the c and e columns, b and f columns, and a and h columns.

While the person moves from the position of FIG. 16A to the position of FIG. 16B, the determination unit 602 determines whether the person is approaching the image processing apparatus 10 as described in the foregoing exemplary embodiments, based on a detection result in a determination area 6011. If the detection area of the heat source exceeds a preset threshold 6013 to enter a return area 6012, the determination unit 602 determines that the human body has approached an area within a predetermined distance (power saving return distance) of the image processing apparatus 10. The determination unit 602 then outputs the energization request signal (signal Q) to the power supply control unit 401 to change the power state of the image processing apparatus 10.

The threshold 6013 illustrated in FIGS. 16A and 16B is set to be a straight line on the fifth row of the detection area. However, the threshold 6013 does not necessarily need to be a straight line and may have various forms including an oblique line and a V shape. The present exemplary embodiment may be applied to the first and second exemplary embodiments, in which case the threshold A or B described in the first and second exemplary embodiments is used as the threshold 6013.

An angle β of the determination area 6011 can be determined by the number of infrared light receiving elements arranged between the bottom of the detection area and the threshold 6013 and the view angle of each of the infrared light receiving elements. For example, if the infrared light receiving elements each have a view angle of 8° in the vertical direction and the threshold 6013 is set at the fifth row as illustrated in FIGS. 16A and 16B, the angle β of the determination area 6011 is 40°. β can be reduced to shorten the distance for the person approaching the image processing apparatus 10 to reach the return area 6012, so that the person approaching the image processing apparatus 10 can quickly use the image processing apparatus 10. However, this reduces the number of infrared light receiving elements in the determination area 6011, and the amount of information available to the determination unit 602 before the person reaches the power saving return distance decreases. β is determined in view of these factors.

The angle α between the bottom of the detection area (the bottom of the field of view) and a horizontal direction can be reduced to start capturing the person approaching the image processing apparatus 10 from a long distance. Reducing the angle α facilitates capturing a heat source in low positions, which can increase misjudgments. α is thus determined in consideration of a tradeoff between the detection start distance of a heat source and misjudgments.

In the state of FIG. 16B, a relationship can be expressed by the following equation (1):

$$H = h - l \times \tan(\alpha + \beta), \tag{1}$$

where H is the height of the human presence sensor 601, h is the height of the person, l is the power saving return distance, and (α+β) is the angle between the horizontal direction and the threshold 6013.

According to equation (1), the height H of the human presence sensor 601 depends on the height h of the person. If the threshold 6013 is adjusted to a short person, a tall person can reach the power saving return distance at a farther position. For example, suppose that the height h of a person ranges from 1200 mm to 1900 mm, the power saving return distance l is 600 mm, and the angle (α+β) between the horizontal direction and the threshold 6013 is 20°. By adjusting the sensor 601 to the short height of 1200 mm, the height H of the human presence sensor 601 can be calculated to be 981 mm.

Figure 17:
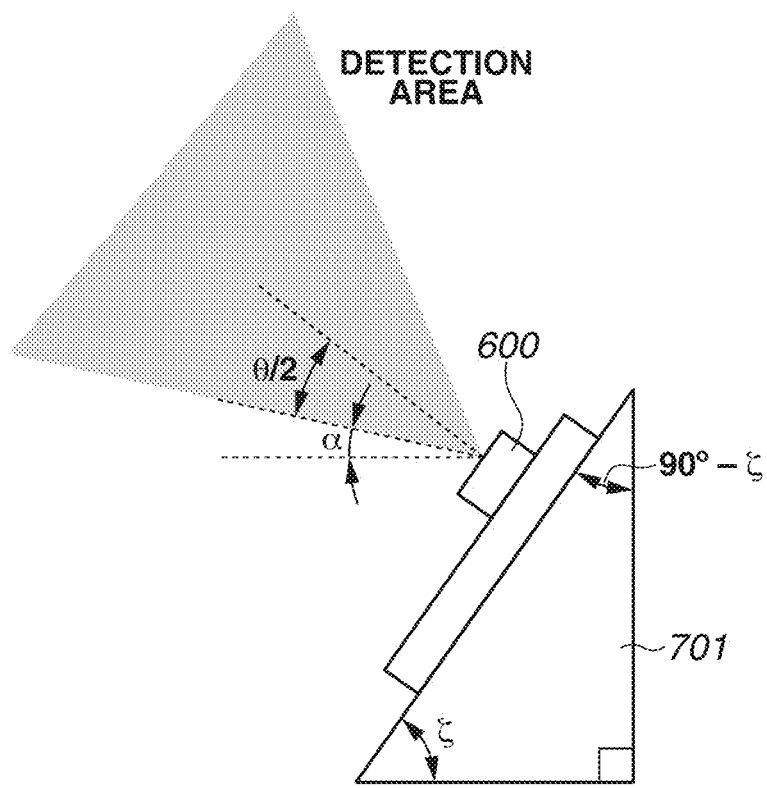
FIG. 17 is a diagram illustrating an example of the shape of a pedestal of a sensor installation unit on which the human presence sensor is installed.

FIG. 17 is a diagram illustrating an example of the shape of a pedestal 701 of a sensor installation unit on which the human presence sensor 601 is installed.

An angle ζ in the pedestal 701 of the sensor installation unit is determined by equation (2):

$$\zeta = 90° - \left(\alpha + \frac{\theta}{2}\right), \tag{2}$$

where α is the angle between the bottom of the field of view and the horizontal direction, and θ is the view angle of the human presence sensor 601 in the vertical direction.

FIGS. 18A to 18C are diagrams illustrating examples where the human presence sensor 601 is installed by the method described in the third exemplary embodiment.

If the human presence sensor 601 is installed on a movable member of the image processing apparatus 10, the direction of the detection area varies along with its movement. The human presence sensor 601 is thus desirably attached to a portion other than movable members. Further, the installation position of the human presence sensor 601 is desirably independent of the presence or absence of optional members. As illustrated in FIG. 18A, the human presence sensor 601 may therefore be installed on the left of the operation unit 500 which is movable, and the authentication unit 700 (IC card reader) which is optional. If the authentication unit 700 is a standard feature, the human presence sensor 601 may be installed on the authentication unit 700 as illustrated in FIG. 18B. If the operation unit 500 is not movable, the human presence sensor 601 may be installed on the front of the operation unit 500.

As described above, the installation position and installation angle of the human presence sensor 601 can be appropriately set to prevent situations in which exposed skin portions enter the detection area of the human presence sensor 601 and an intended heat source is buried within surrounding temperatures, so that a false detection or detection failure occurs. As a result, the person approaching the image processing apparatus 10 can reach the return area 6012 from the set power saving return distance or from a greater distance. The human presence sensor 601 can detect the person approaching the image processing apparatus 10 in an appropriate position to reduce false detections. In other words, the image processing apparatus 10 quickly becomes usable by the person approaching the image processing apparatus 10. This improves the convenience of use of the image processing apparatus 10. Further, power control can be performed with fewer misjudgments, in consideration of differences of physical frames of persons approaching the image processing apparatus 10.

A fourth exemplary embodiment deals with conditions such as the height at which the human presence sensor 601 is attached to the image processing apparatus 10.

Figure 19A:
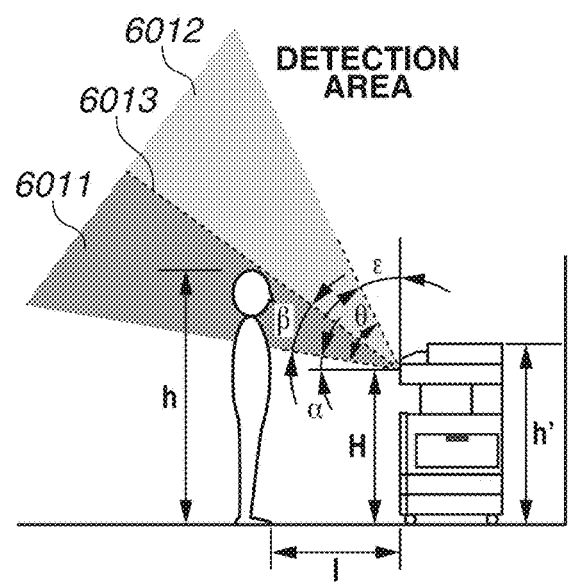
FIGS. 19A and 19B are diagrams illustrating examples of a relationship between the heights of and distance between the image processing apparatus and a human body at the moment when the person approaching the image processing apparatus reaches a power saving return distance.
Figure 19B:
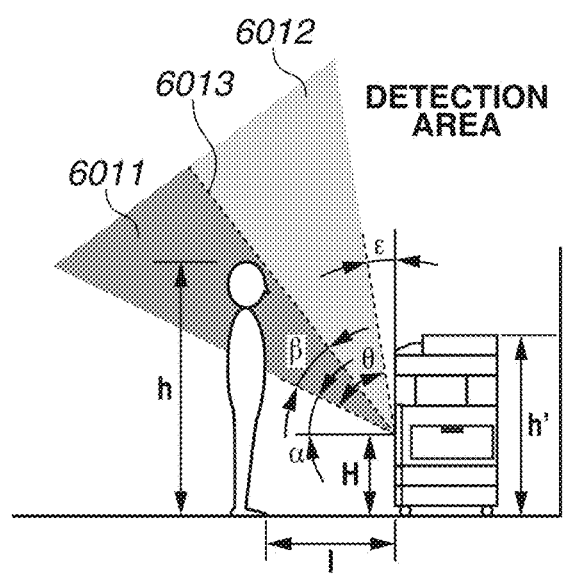

FIGS. 19A and 19B are diagrams illustrating examples of the relationship between the heights and distance of the human body and the image processing apparatus 10, at the moment when the person approaching the image processing apparatus 10 has reached the power saving return distance.

In FIGS. 19A and 19B, the power saving return distance and the height of the person are the same. The human presence sensor 601 is attached to satisfy the relationship of the foregoing equation (1). However, FIGS. 19A and 19B differ in the height H of the attachment position of the human presence sensor 601.

FIG. 19B illustrates a state in which the human presence sensor 601 is shifted and attached to a lower position. This reduces the angle ε from the top of the detection area to the vertical direction. If ε=0°, the top of the detection area of the human presence sensor 601 touches the image processing apparatus 10 (own apparatus) itself on which the human presence sensor 601 is installed. As a result, the return area 6012 can detect heat generated by the own apparatus, and the determination unit 602 can make a misjudgment. Accordingly, to reduce the possibility of misjudgment, ε>0 needs to be satisfied. In other words, the condition of the following equation (3) needs to be satisfied:

$$\alpha + \theta < 90° \quad (3)$$

From equations (1) and (3), the height H of the human presence sensor 601 is limited by equation (4):

$$H > h - l \times \tan(90° + \beta - \theta). \quad (4)$$

Further, from equations (2) and (3), the angle ζ in the pedestal 701 of the human presence sensor 601 is limited by equation (5):

$$\zeta > \frac{\theta}{2}. \quad (5)$$

For example, suppose that the height h of the person is 1200 mm, the power saving return distance l is 600 mm, and the angle β of the determination area 6011 is 15°. In such a case, α<30°, H>600 mm, and ζ>30°.

According to the fourth exemplary embodiment, the height for attaching the human presence sensor 601 is limited to the foregoing condition. In addition to the effects described in the third exemplary embodiment, such a limitation prevents the top of the detection area of the human presence sensor 601 from touching the own apparatus, and can thus reduce the possibility of misjudgment.

A fifth exemplary embodiment will be described below. In the foregoing first to fourth exemplary embodiments, an infrared array sensor is used as the human presence sensor 601. However, a camera may be used instead of the infrared array sensor. In such a configuration, the camera captures an image of the human body, and the distribution of the detection region of the human body in the imaging area is identified from the captured image similar to the case of the infrared array sensor. Suppose that part of the human body is captured at the bottom of the captured image of the camera installed on the image processing apparatus 10, and the top position of the image of the human body exceeds the threshold A or the top position of the image of a hand exceeds the threshold B. In such a case, the power mode of the image processing apparatus 10 is changed similar to the case of the infrared array sensor. Note that the camera is installed on the image processing apparatus 10 according to the method described in the foregoing third and fourth exemplary embodiments.

As described above, according to the fifth exemplary embodiment, a readily-available camera can be used instead of the human presence sensor 601. Even in such a case, false detections of a person approaching the image processing apparatus 10 can be reduced and appropriate power control is carried out.

As has been described above, according to an exemplary embodiment, whether a person approaching the image processing apparatus 10 is a user having an intention of operating or just a passerby can be accurately determined at an earlier stage to switch the power state of the image processing apparatus 10, by using a single human presence sensor 601.

Specifically, the conventional configuration of detecting the approach of a person nearing the image processing apparatus before cancelling the power saving mode is improved so that whether the person has an intention of operating can be determined before the person approaches close to the image processing apparatus 10. This can improve the convenience of the image processing apparatus 10. The implementation using a single human presence sensor 601 can suppress the product cost and enables the user detection even in the power saving mode with smaller power consumption. Further, false detections can also be suppressed and useless power consumption caused by the recovery of the image processing apparatus 10 due to false detections can be reduced.

The disclosure is not limited to an image processing apparatus and may be applied to other electronic apparatuses that operate which can switch to a plurality of power states.

As described above, according to an exemplary embodiment, the user approaching the image processing apparatus can be accurately determined in the power saving mode with smaller power consumption, and the power state of the image processing apparatus can be switched at earlier, appropriate timing. As a result, the wait time of the user can be reduced to improve the convenience of the user. The product cost can be reduced as well.

The configuration and contents of the foregoing various types of data are not limited to them. Various configurations and contents may be used according to the intended applications and purposes.

Several exemplary embodiments of the disclosure have been described above. Exemplary embodiments of the disclosure may further include a system, apparatus, method, program, and storage medium. Specifically, an exemplary embodiment of the disclosure may be applied to a system including a plurality of devices or applied to an apparatus including a single device.

Further, any configurations obtained by combining the foregoing exemplary embodiments are also intended to be covered by the disclosure.

(Other Exemplary Embodiments)

An exemplary embodiment may be implemented by executing the following processing. The processing includes supplying software (program) for implementing the functions of the foregoing exemplary embodiments to a system or an apparatus via a network or various storage media, and reading and executing the program by a computer (or CPU or micro processing unit (MPU)) of the system or the apparatus.

An exemplary embodiment may be applied to a system including a plurality of devices or an apparatus including a single device.

The disclosure is not limited to the foregoing exemplary embodiments. Various modifications (including organic combinations of the exemplary embodiments) may be made based on the gist of the disclosure, and such modifications are not excluded from the scope of the disclosure. That is, all configurations obtained by combining the foregoing exemplary embodiments and modifications thereof are also intended to be covered by the disclosure.

According to an exemplary embodiment of the disclosure, the user approaching the image processing apparatus can be accurately determined in the power saving mode with smaller power consumption, and the power state of the image processing apparatus can be switched at appropriate timing. As a result, the wait time of the user can be reduced to improve the convenience of the user. The product cost can be reduced as well.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-028212 filed Feb. 18, 2014, which is hereby incorporated by reference herein in its entirety.

What is claimed is:

1. An image processing apparatus capable of entering a first power state and a second power state in which power consumption is lower than power consumption in the first power state, the image processing apparatus comprising:
 a human sensor which has a plurality of elements, wherein each of the plurality of elements outputs temperature information;
 a controller which determines whether a first feature position of a first detection area formed by a plurality of elements, among the plurality of elements, that outputs a temperature equal to or higher than a first temperature is above a first predetermined height and determines whether a second feature position of a second detection area formed by a plurality of elements, among the plurality of elements, that outputs a temperature equal to or higher than a second temperature that is higher than the first temperature is above a second predetermined height that is lower than the first predetermined height; and
 a power controller which, if the controller determines that the first feature position is above the first predetermined height, shifts the image processing apparatus from the second power state to the first power state, and, if the controller determines that the second feature position is above the second predetermined height, shifts the image processing apparatus from the second power state to the first power state.

2. The image processing apparatus according to claim 1, further comprising an operation unit which receives a user operation for the image processing apparatus,
 wherein the human sensor is provided above the operation unit.

3. The image processing apparatus according to claim 1, wherein the human sensor is arranged with a detection surface looking obliquely upward.

4. The image processing apparatus according to claim 1, wherein the human sensor is arranged to face in a direction oblique to a front of the image processing apparatus.

5. The image processing apparatus according to claim 1, wherein the human sensor is an infrared array sensor including a plurality of infrared light receiving elements.

6. The image processing apparatus according to claim 1, wherein the human sensor is a camera which captures an image of a human.

7. A method for controlling an image processing apparatus capable of entering a first power state and a second power state in which power consumption is lower than power consumption in the first power state, the image processing apparatus including a human sensor which has a plurality of elements, wherein each of the plurality of elements outputs temperature information, the method comprising:

determining whether a first feature position of a first detection area formed by a plurality of elements, among the plurality of elements, that outputs a temperature equal to or higher than a first temperature is above a first predetermined height and determines whether a second feature position of a second detection area formed by a plurality of elements, among the plurality of elements, that outputs a temperature equal to or higher than a second temperature that is higher than the first temperature is above a second predetermined height that is lower than the first predetermined height;

if it is determined that the first feature position is above the first predetermined height, shifting the image processing apparatus from the second power state to the first power state; and if it is determined that the second feature position is above the second predetermined height, shifting the image processing apparatus from the second power state to the first power state.

8. A non-transitory recording medium on which is recorded a program for causing a computer of an image processing apparatus having a human sensor which has a plurality of elements, wherein each of the plurality of elements outputs temperature information, and capable of entering a first power state and a second power state in which power consumption is lower than power consumption in the first power state to perform operations comprising:

determining whether a first feature position of a first detection area formed by a plurality of elements, among the plurality of elements, that outputs a temperature equal to or higher than a first temperature is above a first predetermined height and determines whether a second feature position of a second detection area formed by a plurality of elements, among the plurality of elements, that outputs a temperature equal to or higher than a second temperature that is higher than the first temperature is above a second predetermined height that is lower than the first predetermined height;

if it is determined that the first feature position is above the first predetermined height, shifting the image processing apparatus from the second power state to the first power state; and if it is determined that the second feature position is above the second predetermined height, shifting the image processing apparatus from the second power state to the first power state.

9. The image processing apparatus according to claim 1, wherein the first feature positon is a top end of the first detection area.

10. The image processing apparatus according to claim 1, wherein the second feature positon is a top end of the second detection area.

* * * * *